(12) United States Patent
Yamashita et al.

(10) Patent No.: US 7,423,824 B2
(45) Date of Patent: Sep. 9, 2008

(54) ACTUATOR, OPTICAL APPARATUS USING ACTUATOR, AND METHOD OF MANUFACTURING ACTUATOR

(75) Inventors: Tatsumaro Yamashita, Miyagi-ken (JP); Hitoshi Yoshiyuki, Miyagi-ken (JP); Masamichi Hayashi, Miyagi-ken (JP); Eiki Matsuo, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 287 days.

(21) Appl. No.: 11/184,565

(22) Filed: Jul. 18, 2005

(65) Prior Publication Data
US 2006/0028743 A1   Feb. 9, 2006

(30) Foreign Application Priority Data
Aug. 6, 2004 (JP) .............................. 2004-231304

(51) Int. Cl.
*G02B 7/02* (2006.01)
*G02B 15/14* (2006.01)

(52) U.S. Cl. ........................ 359/824; 359/822; 359/694; 359/704; 359/819

(58) Field of Classification Search ................. 359/824, 359/822, 819, 694, 696, 704, 818, 823, 697; 396/72, 93, 106
See application file for complete search history.

(56) References Cited

U.S. PATENT DOCUMENTS
2001/0043411 A1 * 11/2001 Emura et al. ................. 359/819

FOREIGN PATENT DOCUMENTS
| JP | 5-249362 | | 9/1993 |
| JP | 08/080065 | * | 2/1994 |
| JP | 2001-286162 | | 10/2001 |

* cited by examiner

*Primary Examiner*—Ricky Mack
*Assistant Examiner*—Brandi N Thomas
(74) *Attorney, Agent, or Firm*—Beyer Law Group LLP

(57) ABSTRACT

An actuator includes a holder having a movement hole, a lens barrel which moves within the movement hole, and driving means for driving the lens barrel. Each of the driving means is provided with driving members composed of an artificial muscle. The lens barrel can be suitably moved within the movement hole by making the driving members perform a predetermined operation.

15 Claims, 20 Drawing Sheets

ACTUATOR, OPTICAL APPARATUS USING ACTUATOR, AND METHOD OF MANUFACTURING ACTUATOR

BACKGROUND OF THE INVENTION

1. Field of the Invention

The present invention relates to an actuator used for, for example, optical apparatuses, etc. which have a holder with a movement hole and a lens barrel for accommodating the lens barrel, and which have a zooming function that the lens barrel moves within the movement hole, etc.

2. Description of the Related Art

A driving mechanism for a lens barrel is disclosed inn FIG. 3 of Japanese Unexamined Patent Application Publication No. 5-249362 (hereinafter, referred to as Patent Document 1). Patent Document 1 discloses provision of an optical apparatus which can perform a focus-switching operation and a focusing operation with a single motor by a combination of the motor, a pinion, gear, etc.

However, the driving mechanism for a lens barrel with the combination of the motor, the gear, etc. is difficult to be assembled into small electronic apparatuses, particularly, mobile telephones.

Further, in order to make the lens barrel perform various kinds of complex operations, an intricate driving mechanism is required. As a result, not only an increase in size of the driving mechanism may be caused, but also an increase in manufacturing cost and a reduction in yield rate may be caused.

Accordingly, it is also considered that conventionally known electrostatic actuators, piezoelectric actuators, etc. are used as the driving mechanism. However, these actuators have problems in that expansion or contraction ratio is low, a high driving force cannot be obtained, the degree of freedom in structure is low, etc.

Meanwhile, actuators called conductive high-polymer actuators (hereinafter referred to as artificial muscle) have been paid attention to as new actuators substituted for the conventional actuators.

As a known document on the artificial muscle, there is Japanese Unexamined Patent Application Publication No. 2001-286162 (hereinafter referred to as Patent Document 2).

Patent Document 2 discloses using the artificial muscle as valve devices, pump devices, bimorphs, etc.

However, Patent Document 2 does not disclose using the artificial muscle as the driving mechanism for a lens barrel at all.

Particularly, when the artificial muscle is used as the driving mechanism for a lens barrel, it was found that various kinds of study on suitably driving the lens barrel are necessary.

SUMMARY OF THE INVENTION

The invention has been made in view of the conventional problems. It is therefore an object of the invention to provide an actuator having an external member with a movement hole, a movable body which moves within the movement hole, and a driving means for driving the movable body, and more particularly to provide the structure and operation of the actuator when the artificial muscle is used as the driving means.

According to an aspect of the invention, an actuator includes an external member having a movement hole; a movable body which moves within the movement hole; and a driving means for driving the movable body. The driving means has a first driving member and a second driving member capable of pressing an external surface of the movable body and an internal surface of the movement hole, and a third driving member located between the first driving member and the second driving member to apply a substantial driving force to the movable body. The first, second and third driving members are arranged with a predetermined gap therebetween in a moving direction of the movable body. Also, the first driving member, the second driving member, and the third driving member are made of a high-polymer material having responsiveness to an electric field.

By making each of the first driving member, the second driving member, and the third driving member of a high-polymer material having responsiveness to an electric field, the movable body can be moved within the movement hole of the external member rapidly and with a high driving force.

In the aspect of the invention, preferably, both the first driving member and the second driving member has an initial state in which the first and second driving members press the external surface of the movable body and the internal surface of the movement hole; a first operation in which, while the first driving member maintains its pressing state from the initial state, the second driving member contracts in a direction away from the external surface of the movable body or the internal surface of the movement hole so that the pressing state of the second driving member is released, and the third driving member expands or contracts in the moving direction of the movable body; a second operation in which the second driving member expands toward the external surface of the movable body or the internal surface of the movement hole so that the second driving member returns to the state of pressing the external surface of the movable body and the internal surface of the movement hole, and the first driving member is separated away from the external surface of the movable body or the internal surface of the movement hole so that the pressing state of the first driving member is released; and a third operation in which the third driving member returns to its initial state, and the first driving member expands toward the external surface of the movable body or the internal surface of the movement hole so that the first driving member returns to the state of pressing the external surface of the movable body and the internal surface of the movement hole. Also, the movable body moves within the movement hole by repeating a series of operations including the first operation, the second operation and the third operation from the initial state.

Further, in the aspect of the invention, preferably, each of the first driving member, the second driving member, and the third driving member has a dielectric elastomer, and expandable and contractable electrodes provided on both sides of the dielectric elastomer.

As described above, by repeating a series of operations including the first operation, the second operation and the third operation from the initial state by using an artificial muscle in which each of the driving members has the dielectric elastomer and the expandable or contractable electrodes, the movable body can be moved within the movement hole of the external member rapidly and with a high driving force. The structure of the driving members can be simplified by constructing each of the driving members with the dielectric elastomer and the expandable and contractable electrodes.

Further, in the aspect of the invention, preferably, each of the first driving member, the second driving member, and the third driving member has the dielectric elastomer, and electrodes provided on both lateral faces of the dielectric elastomer that faces the external surface of the movable body and the internal surface of the movement hole. One of the electrodes which faces the external surface of the movable body or the internal surface of the movement hole is provided over the entire lateral face of the dielectric elastomer constituting each of the driving members, as an electrode common to the first driving member, the second driving member, and the third driving member. In the initial state, at least the electrodes constituting the first driving member and the second driving member abut on the external surface of the movable body and the internal surface of the movement hole to press the external surface of the movable body and the internal surface of the movement hole. In the first operation, the third driving member performs an operation of expanding in the moving direction of the movable body.

By the above construction, the movable body can be suitably moved within the movement hole of the external member.

Further, in the above case, preferably, the electrode of the first driving member, the second driving member, and the third driving member which faces the external surface of the movable body is the common electrode, and the common electrode is fixed to and supported by the external surface of the movable body. In the case concerned, the movable body is divided into at least two or more with a predetermined gap therebetween in its moving direction, and the predetermined gap faces a portion of the dielectric elastomer constituting the third driving member with the common electrode therebetween.

Accordingly, the movable body can be more suitably moved within the movement hole of the external member.

Further, in the aspect of the invention, preferably, the electrode of the first driving member, the second driving member, and the third driving member which faces the internal surface of the movement hole is the common electrode, and the common electrode is fixed to and supported by a supporting part protruding from the internal surface of the movement hole toward the external surface of the movable body.

Further, in the aspect of the invention, preferably, the first to third driving members shares one dielectric elastomer, and a portion of the one dielectric elastomer corresponding to each of the driving members contracts partially in a predetermined direction. Thus, each of driving members can be driven at low cost.

Further, in the aspect of the invention, preferably, the internal surface of the movement hole or the external surface of the movable body is provided, in the moving direction, with spots having their shapes deformed at pressing positions of the driving members, and the position of the movable body within the movement hole is detected based on a change in the amount of deformation of the dielectric elastomer when the dielectric elastomer and the electrodes of each of the driving members presses the internal surface of the movement hole and the external surface of the movable body. In other words, the driving members can be used as position sensors as well as the movable body is moved by driving of the actuating members.

Further, in the aspect of the invention, preferably, a plurality of projections are provided at predetermined intervals in the moving direction of the movable body. Alternatively, the cross-sectional area of the movable body or the external member when being cut in the horizontal direction with respect to the moving direction changes continuously or intermittently. Thus, the actuating members can be suitably used as position sensors.

According to another aspect of the invention, an optical apparatus uses one of the above-mentioned actuators. The external member is a cylindrical holder, the movable body is a lens barrel, and a lens is accommodated within the lens barrel. By driving of the driving members according to the aspect of the invention, a zooming function, a focusing function, etc. can be suitably performed.

According to still another aspect of the invention, a method of manufacturing one of the above-mentioned actuators includes the steps of: accommodating the movable body having the driving members within a jig having a movement hole; attaching the jig to the external member so as to form a movement hole continuous from the external member toward the external member; and moving the movable body to a predetermined position in the movement hole of the external member from the movement hole of the jig by repeatedly performing the series of operations on the driving members accommodated within the jig.

As such, according to the above aspect of the invention, since the movable body accommodated within the jig can be easily moved to a predetermined position in the movement hole of the external member from the movement hole of the jig by repeatedly performing the series of operations on the driving members, the assembling process of attaching the movable body to the inside of the movement hole of the external member can be performed simply.

DESCRIPTION OF THE PREFERRED EMBODIMENTS

Figure 1:
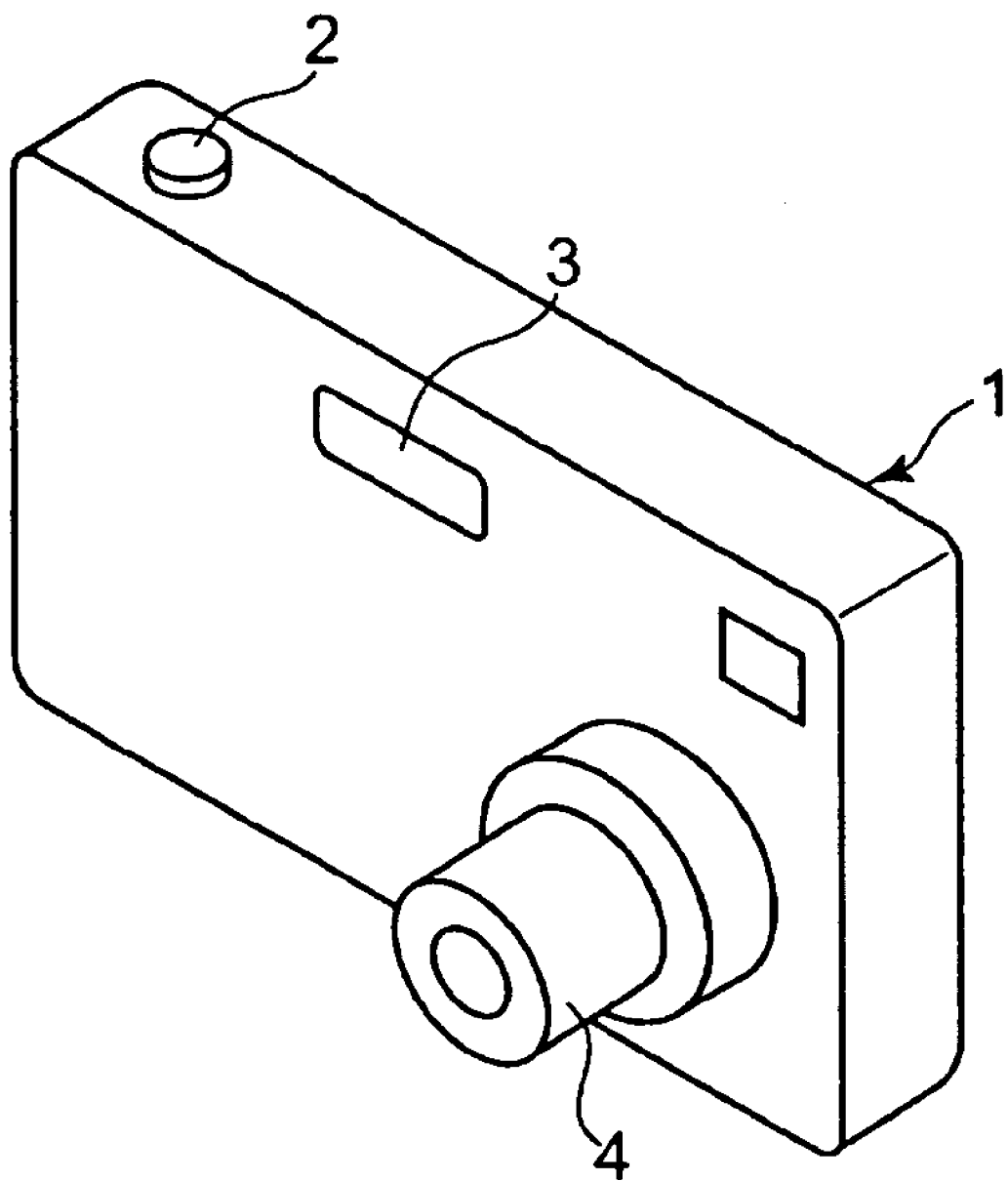
FIG. 1 is a partial perspective view showing the appearance of a digital camera using a lens driving mechanism (actuator) according the invention.
Figure 7:
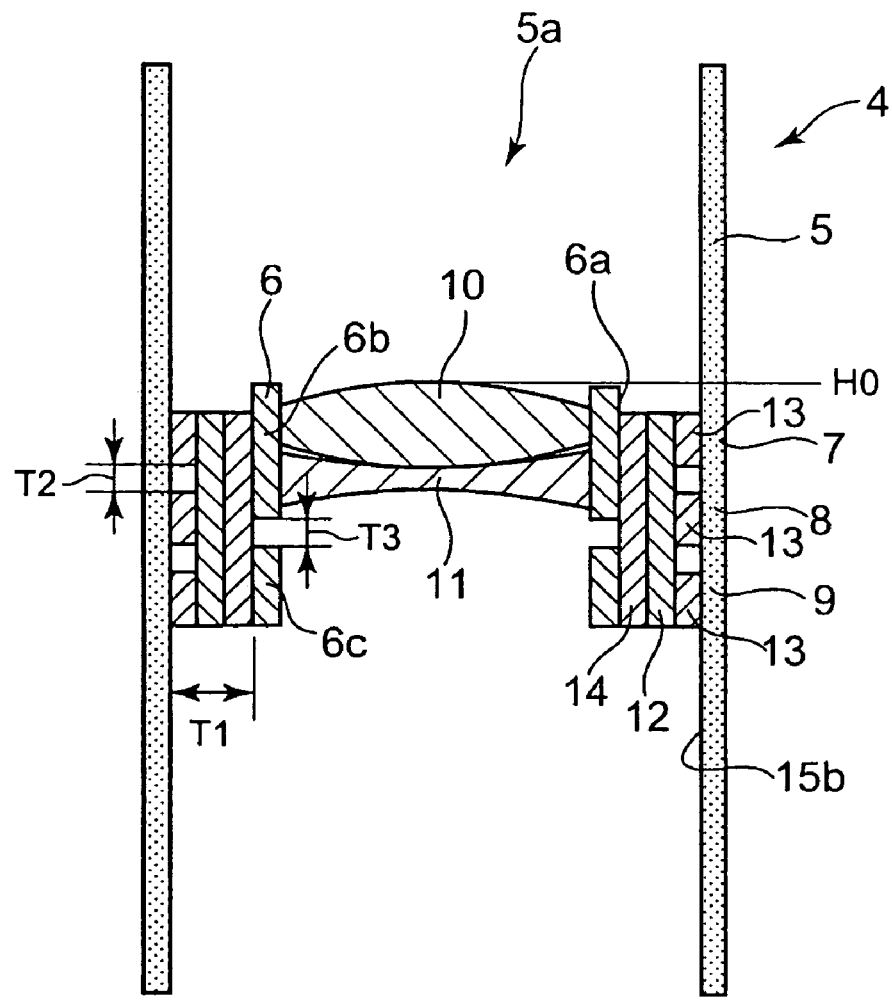
FIG. 7 is a partial sectional view of an actuator having another form of a driving part different from that of the driving part shown in FIG. 2.
Figure 8:
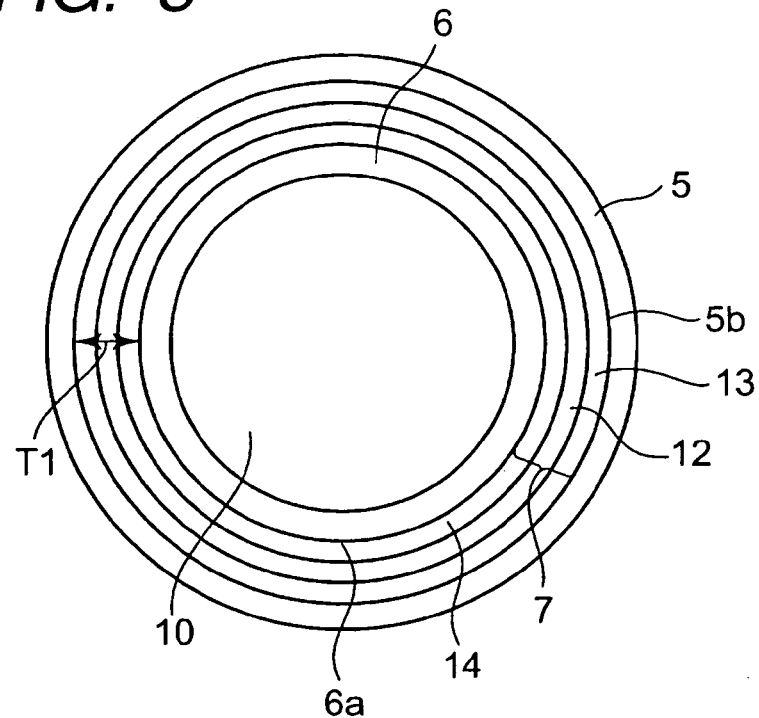
FIG. 8 is a partial plan view of the actuator shown in FIG. 2, as seen from above.
Figure 9:
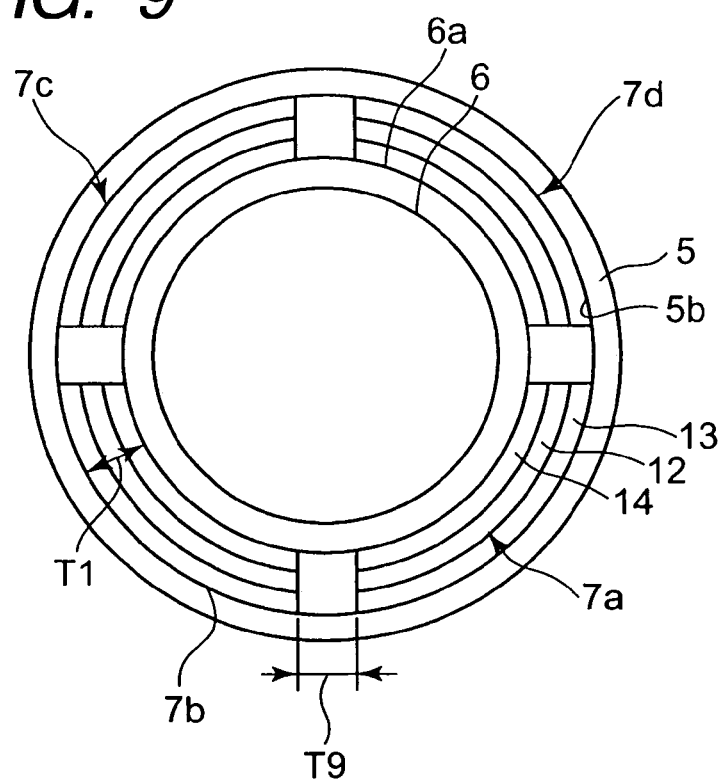
FIG. 9 is a partial plan view of an actuator having another form of a driving part different from that of the driving part shown in FIG. 2.
Figure 10:
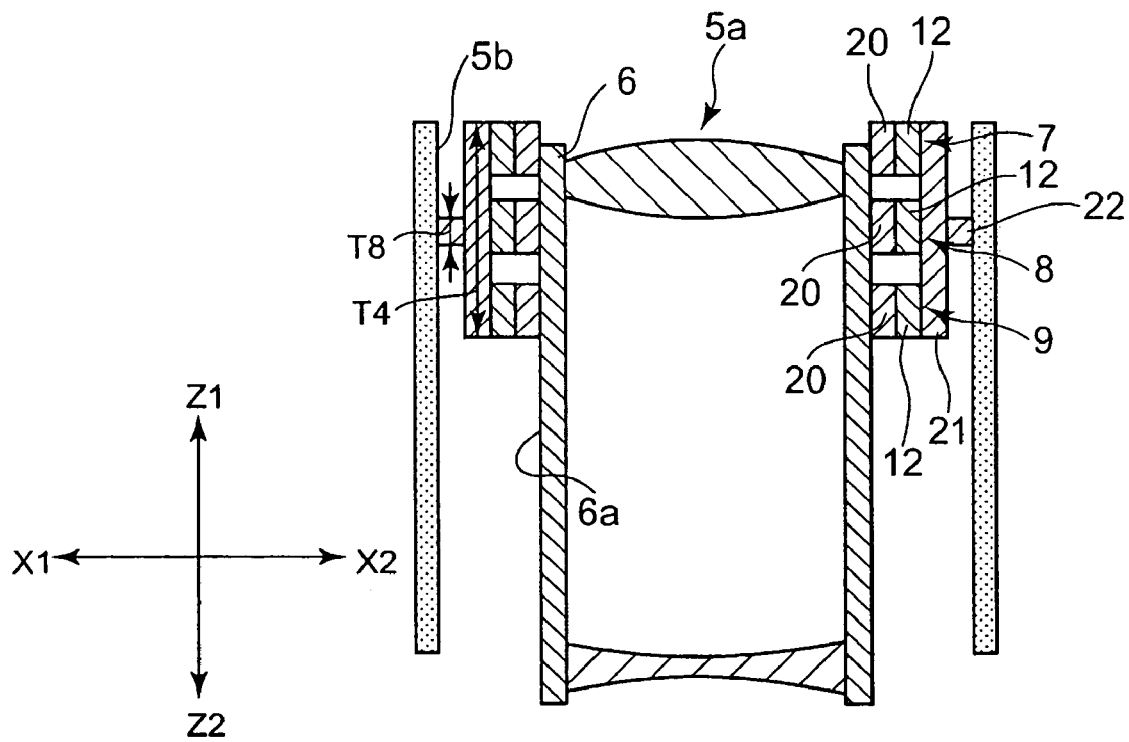
FIG. 10 is a partial sectional view of an actuator according to a second embodiment of the invention.
Figure 11:
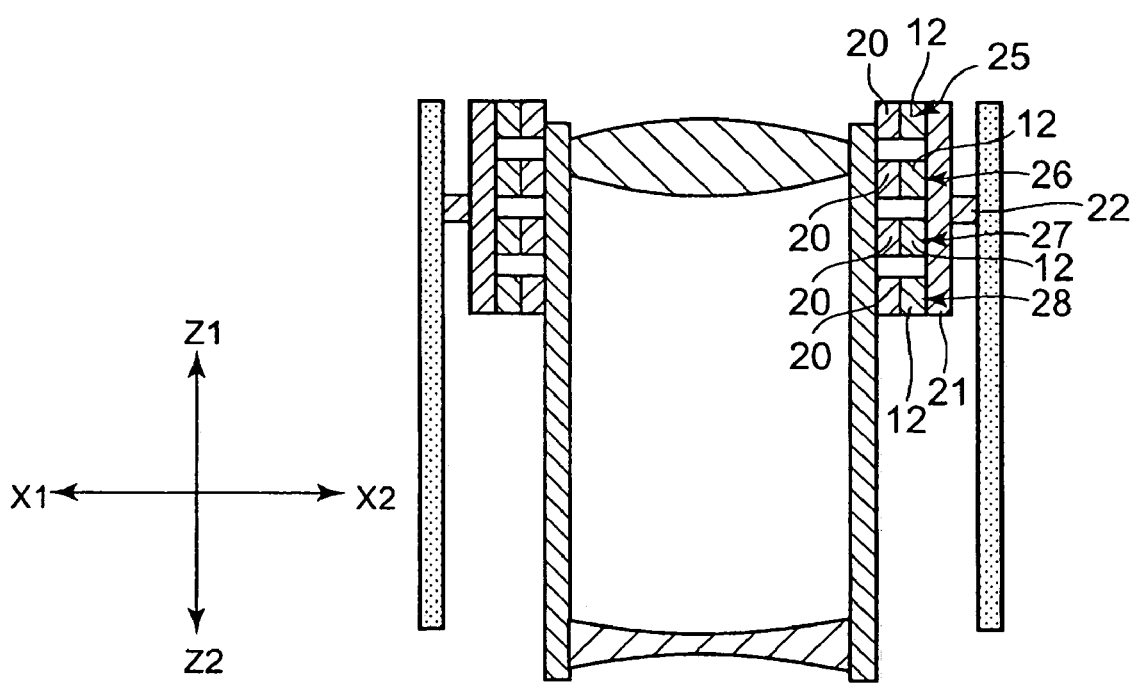
FIG. 11 is a partial sectional view of an actuator having a structure partially different from that of the actuator shown in FIG. 10.
Figure 16:
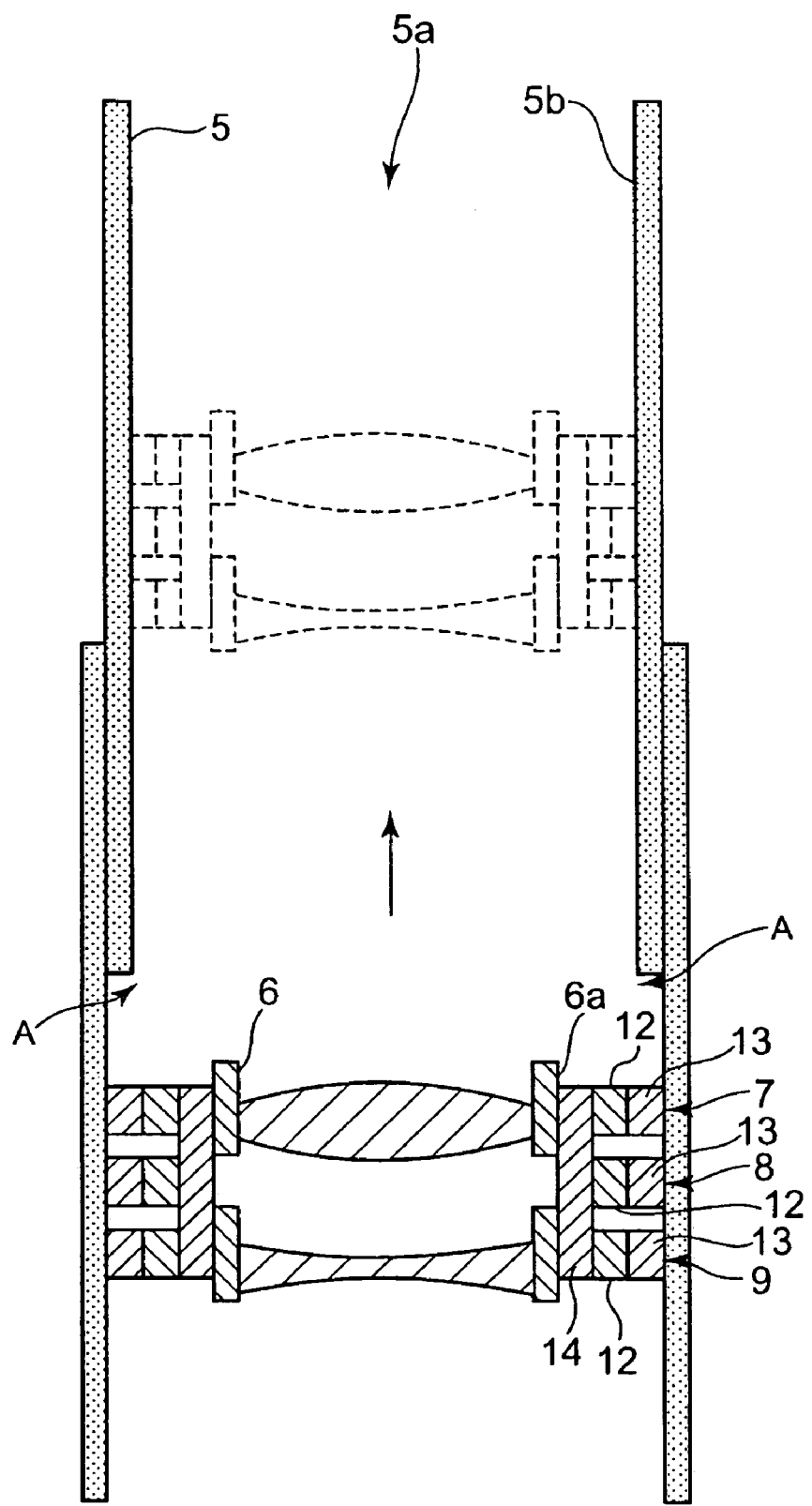
FIG. 16 is a partial sectional view of an actuator according to a fourth embodiment of the invention of which the structure of an external member is different from those in the first to third embodiments.
Figure 17:
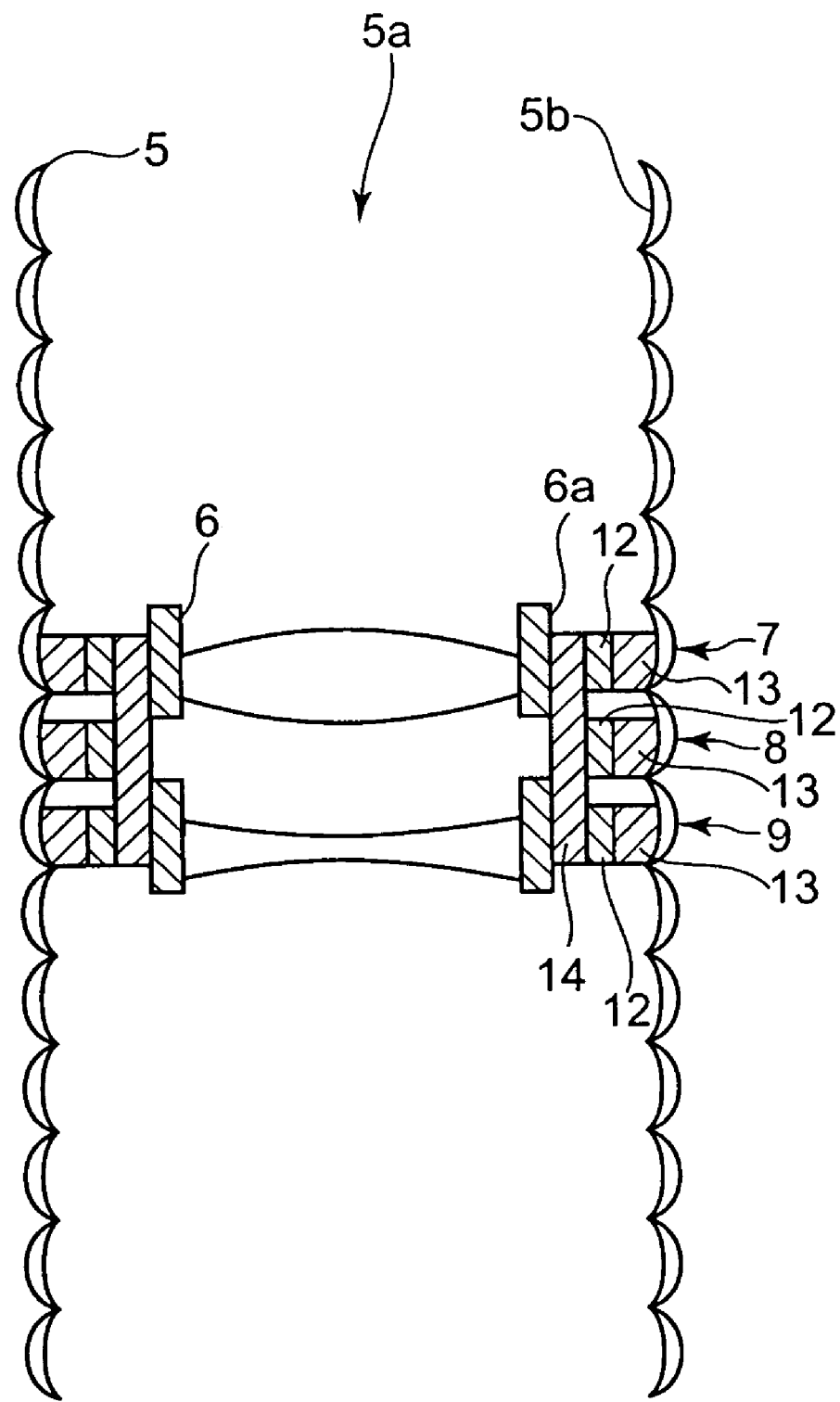
FIG. 17 is a partial sectional view of an actuator according to a fifth embodiment of the invention of which the structure of an external member is different from those in the first to fourth embodiments.
Figure 18:
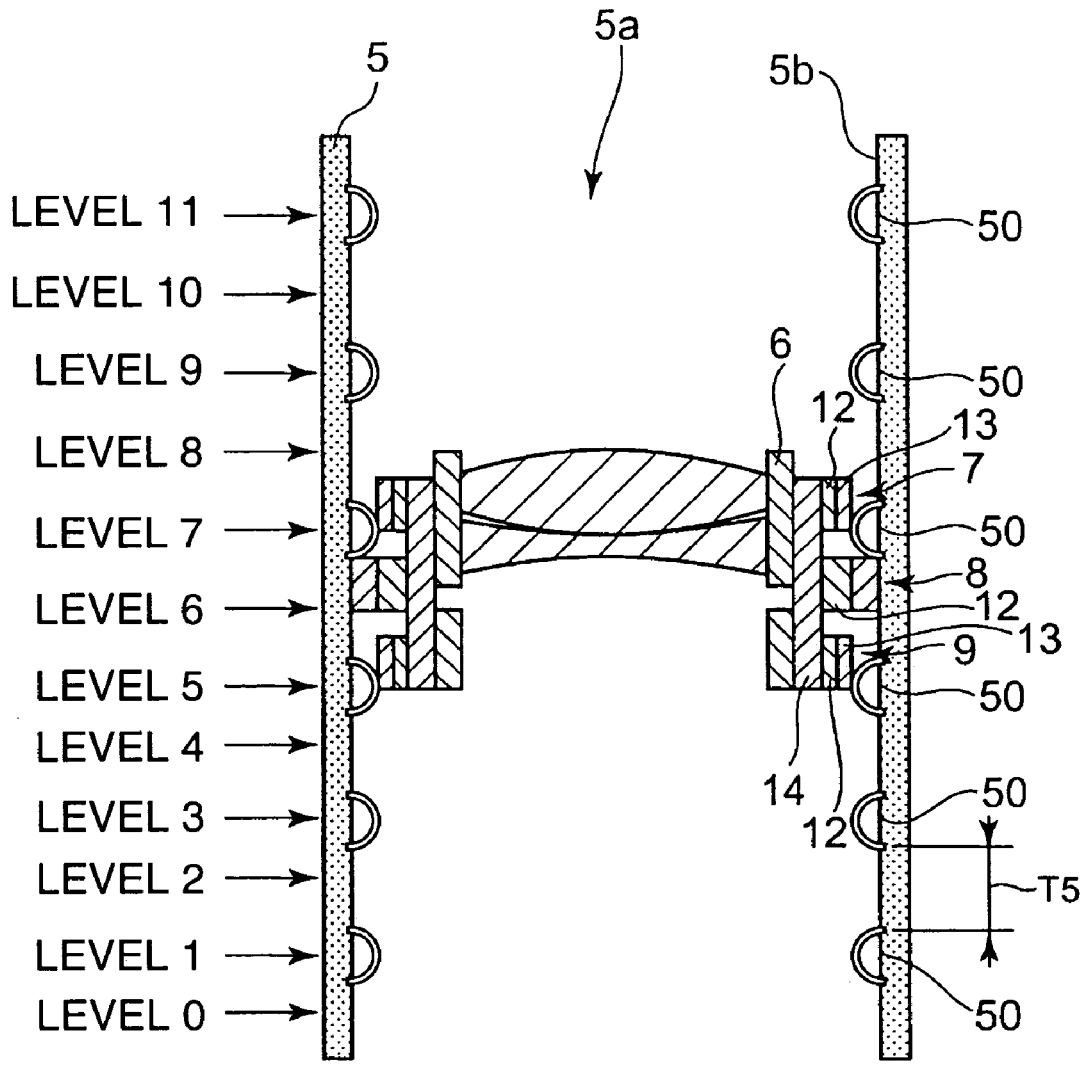
FIG. 18 is an explanatory view for explaining that the actuator according to the invention can also be used as a position sensor, and a partial plan view of an actuator according to a sixth embodiment of the invention.
Figure 19:
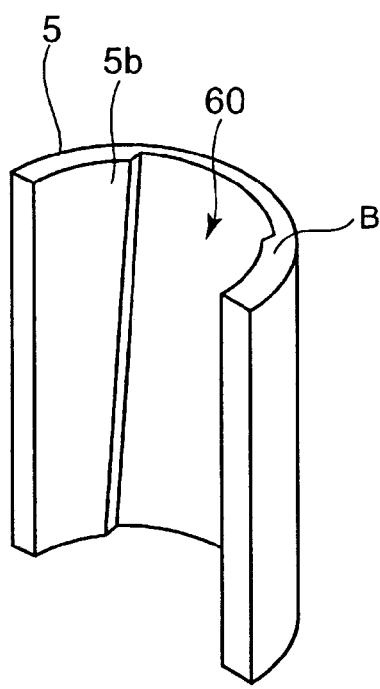
FIG. 19 is an explanatory view for explaining that the actuator according to the invention can also be used as a position sensor, and a partial plan view of an actuator (only a portion of an external member is shown in the drawing) according to a seventh embodiment of the invention.
Figure 20:
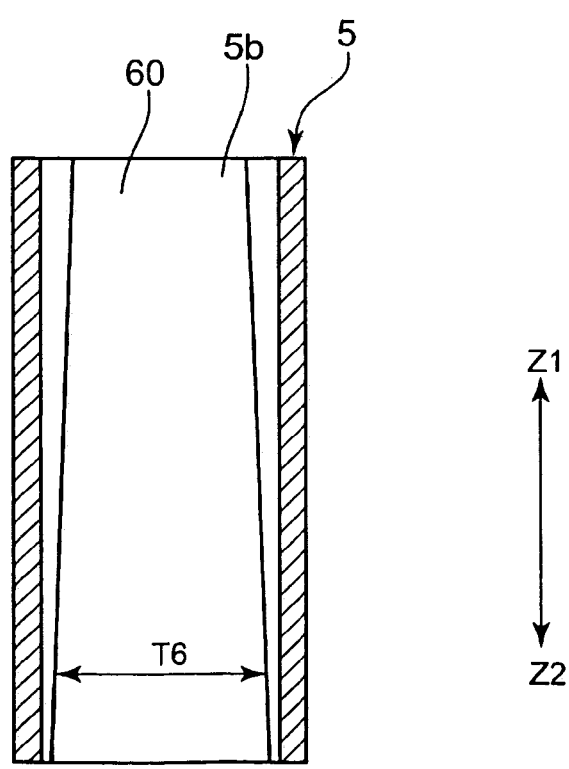
FIG. 20 is a partial sectional view of an actuator (only a portion of an internal surface of an external member is shown in the drawing) according to an eighth embodiment of the invention, when the external member in FIG. 19 is seen from the direction of an arrow.
Figure 21:
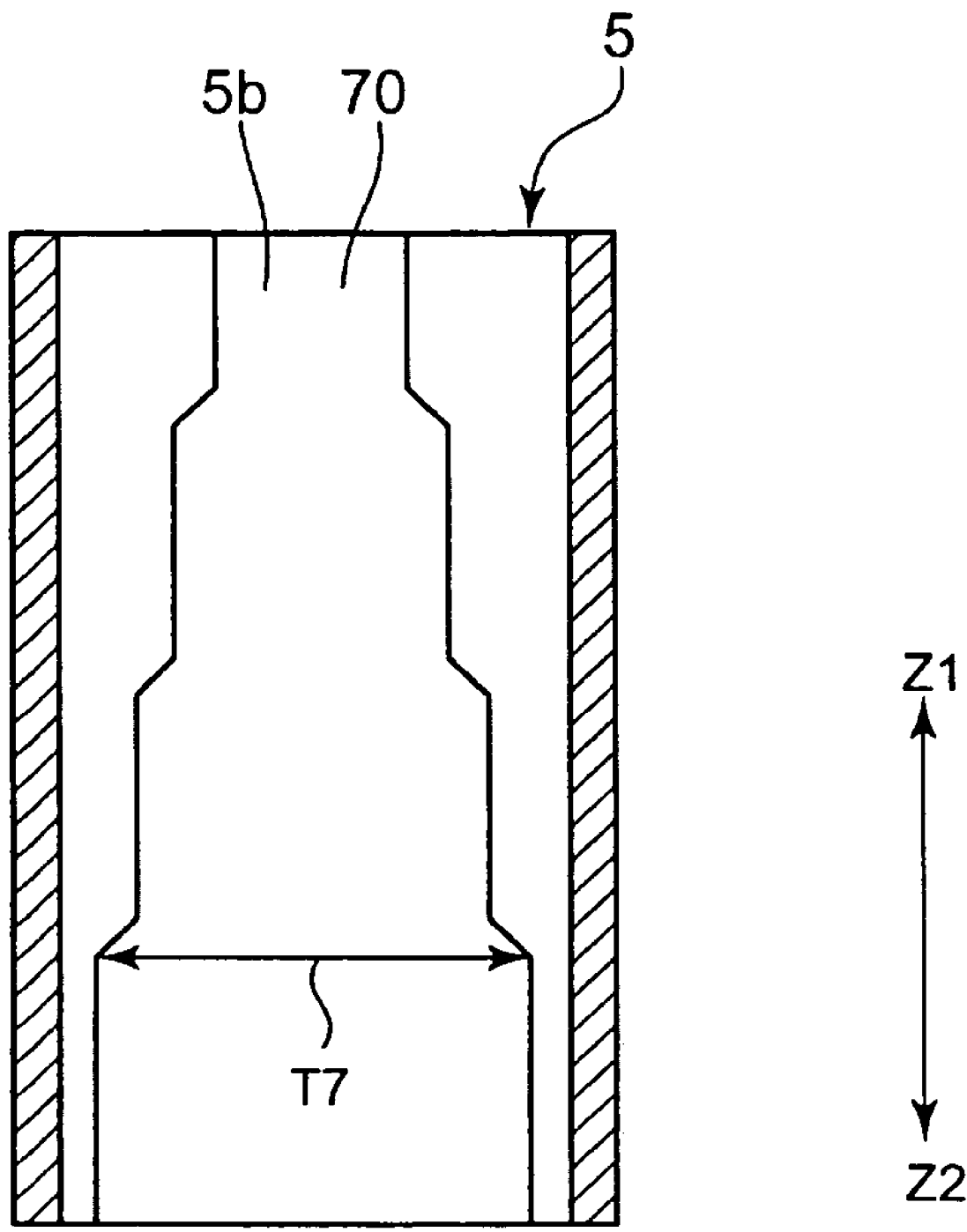
FIG. 21 is an explanatory view for explaining that the actuator according to the invention can also be used as a position sensor, and a partial plan view of an actuator (only a portion of an internal surface of an external member is shown in the drawing) according to a ninth embodiment of the invention.
Figure 22:
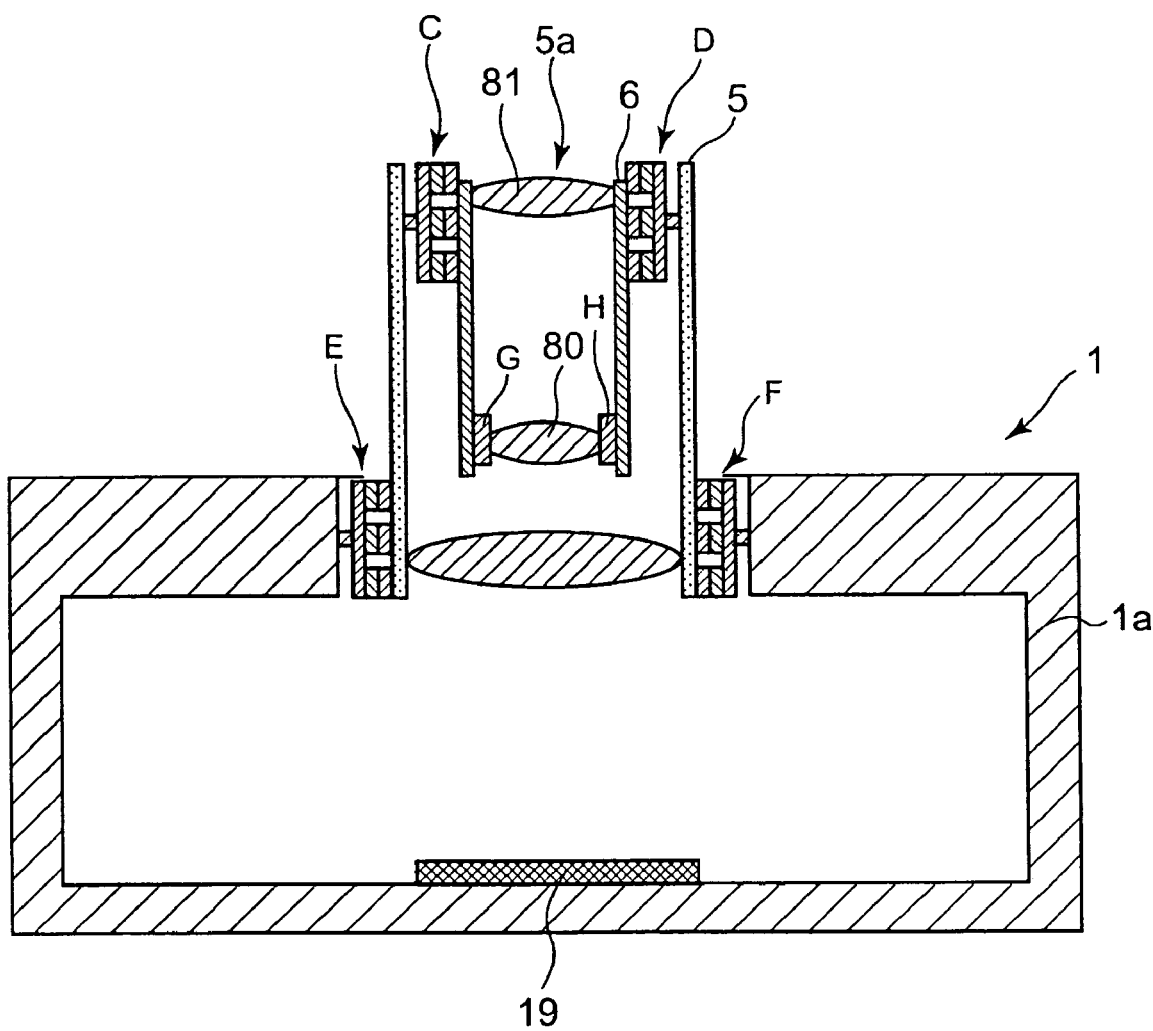
FIG. 22 is a partial sectional view for explaining the internal structure of a digital camera assembled using the actuator according to the invention.
Figure 23:
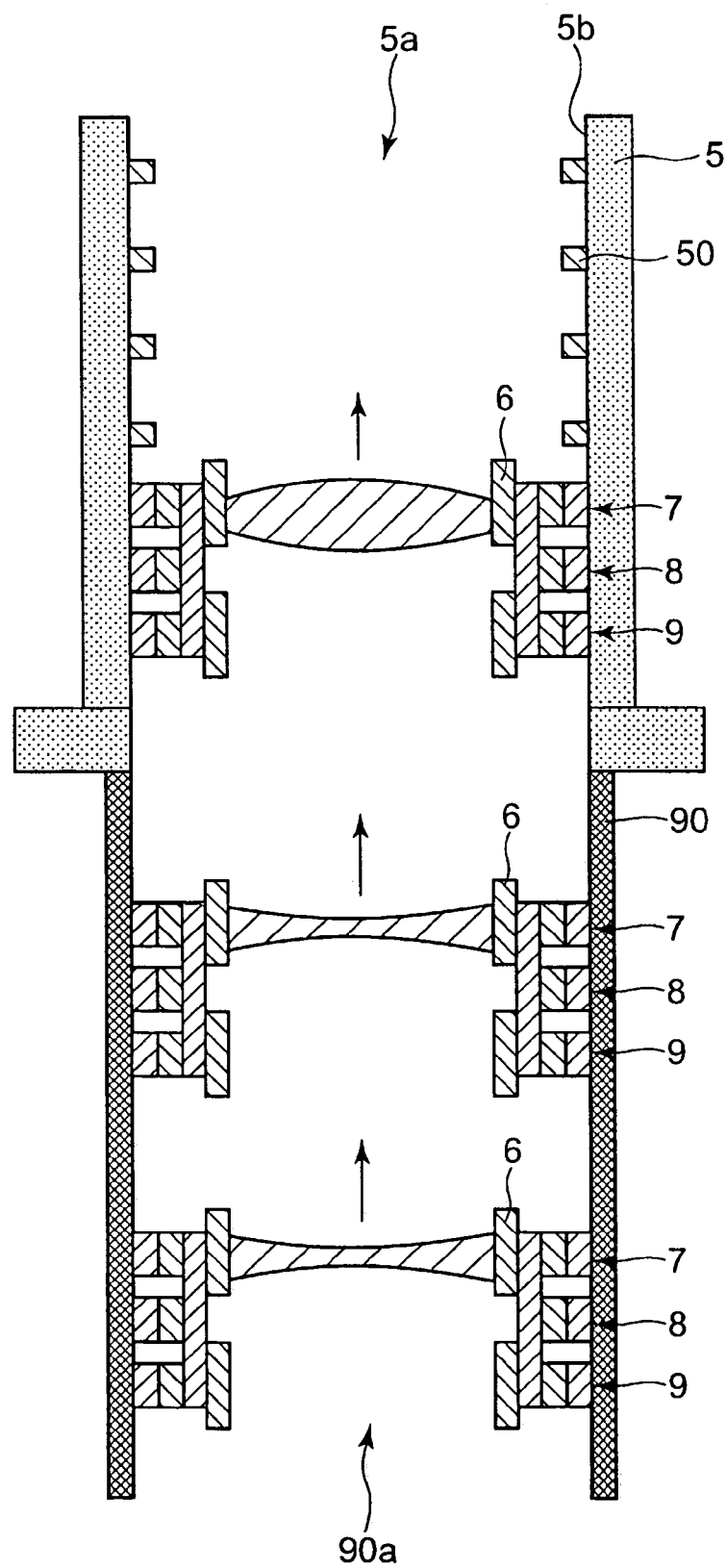
FIG. 23 is a partial sectional view during a manufacturing process for explaining an assembling process of the actuator according to the invention.

FIG. 1 is a partial perspective view showing the appearance of a digital camera using a lens driving mechanism (actuator) according the invention. FIGS. 2 to 6 are partial sectional view of an actuator according to a first embodiment of the invention, and explanatory views for explaining a series of operations of the actuator. FIG. 7 is a partial sectional view of an actuator having another form of a driving part different from that of the driving part shown in FIG. 2. FIG. 8 is a partial plan view of the actuator shown in FIG. 2, as seen from above. FIG. 9 is a partial plan view of an actuator having another form of a driving part different from that of the driving part shown in FIG. 2. FIGS. 10 and 11 are partial sectional views of an actuator according to a second embodiment of the invention. FIGS. 12 to 15 are partial sectional view of an actuator according to a third embodiment of the invention, and explanatory view for explaining a series of operations of the actuator. FIG. 16 is a partial sectional view of an actuator according to a fourth embodiment of the invention of which the structure of an external member is different from those in the first to third embodiments. FIG. 17 is a partial sectional view of an actuator according to a fifth embodiment of the invention of which the structure of an external member is different from those in the first to fourth embodiments. FIG. 18 is an explanatory view for explaining that the actuator according to the invention can also be used as a position sensor, and a partial plan view of an actuator according to a sixth embodiment of the invention. FIG. 19 is an explanatory view for explaining that the actuator according to the invention can also be used as a position sensor, and a partial plan view of an actuator (only a portion of an external member is shown in the drawing) according to a seventh embodiment of the invention. FIG. 20 is a partial sectional view of an actuator (only a portion of an internal surface of an external member is shown in the drawing) according to an eighth embodiment of the invention, when the external member in FIG. 19 is seen from the direction of an arrow. FIG. 21 is an explanatory view for explaining that the actuator according to the invention can also be used as a position sensor, and a partial plan view of an actuator (only a portion of an internal surface of an external member is shown in the drawing) according to a ninth embodiment of the invention. FIG. 22 is a partial sectional view for explaining the internal structure of a digital camera assembled using the actuator according to the invention. FIG. 23 is a partial sectional view during a manufacturing process for explaining an assembling process of the actuator according to the invention.

A digital camera 1 shown in FIG. 1 is provided with a shutter 2, a strobo (electric flash) 3, a lens driving mechanism 4, etc.

Figure 2:
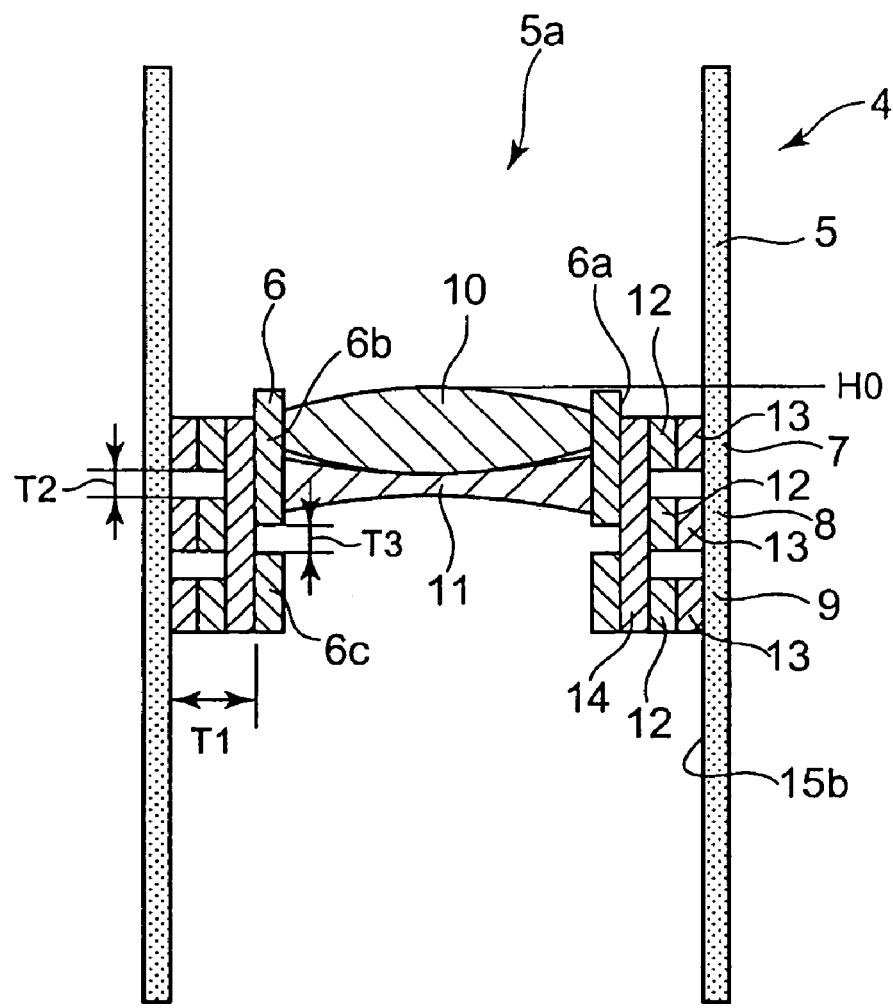
FIG. 2 is a partial sectional view of an actuator according to a first embodiment of the invention, and an explanatory view for explaining a series of operations of the actuator.

As shown in FIG. 2, the lens driving mechanism (actuator) 4 is configured to have a holder (external member) 5, a lens barrel (movable body) 6, and driving members 7, 8 and 9.

As shown in FIGS. 2 and 8, the holder 5 is cylindrical, and as shown in FIG. 2, the holder is provided with a hole 5a for vertical movement in the drawing.

The lens barrel 6 moves vertically in the movement hole 5a, and as shown in FIG. 9, the lens barrel 6 is also formed in a cylindrical shape. As shown in FIG. 2, a convex lens 10, a convex lens 11, etc. are accommodated within the lens barrel 6.

As shown in FIGS. 2 and 8, a predetermined gap T1 is defined between the holder 5 and the lens barrel 6, and the driving members 7, 8 and 9 formed in a ring shape are provided in the gap T1.

As shown in FIG. 2, the respective driving members 7, 8 and 9 are provided with a predetermined gap T2 therebetween in a direction in which the lens barrel 6 moves (Z1-Z2 direction in the drawing).

Each of the driving members 7, 8 and 9 is provided with a dielectric elastomer 12 formed in a ring shape as seen from right above, and an outside electrode 13 formed in a ring shape as seen from right above and provided on the outer circumferential surface of the dielectric elastomer 12 which faces the internal surface 5b of the movement hole 5a.

As shown in FIG. 2, the inner circumferential surface of each of the driving members 7, 8 and 9 which faces the external surface 6a of the lens barrel 6 is provided with a common electrode 14 integrally formed over the entire inner circumferential surface of the dielectric elastomer 12 of each of the driving members 7, 8 and 9.

As shown in FIG. 2, the lens barrel 6 is composed of an upper lens barrel 6b and a lower lens barrel 6c which are divided into two in its moving direction (Z1-Z2 direction in the drawing), and a divided region formed with a predetermined gap T3 is provided between the upper lens barrel 6b and the lower lens barrel 6c.

The common electrode 14 shown in FIG. 2 is joined and fixed to the upper lens barrel 6b and the lower lens barrel 6c with adhesive (not shown).

As shown in FIG. 2, an image pickup device 19, such as a CCD (Charge-Coupled Device) or a CMOS (Complementary Metal-Oxide Semiconductor), is disposed in a lower portion of the lens barrel 6. The image pickup device 19 picks up an image of a photographic subject via the lenses 10 and 11.

As described above, each of the driving members 7, 8, and 9 is made up of the dielectric elastomer 12 and the electrodes 13 and 14. Each of the driving members 7, 8 and 9 constitutes a conductive high-polymer actuator (hereinafter referred to as an artificial muscle).

The dielectric elastomer 12 is formed of a soft plastic material, such as silicon resin or acrylic resin, having electrical responsiveness. Further, the electrodes 13 and 14 are formed of a stretchable material, for example, a flexible high-polymer material into which conductive carbon particles are blended.

When a voltage is applied between these electrodes 13 and 14, positive charges are accumulated at one electrode, and negative charges are accumulated at the other electrode. In this state, the electrodes 13 and 14 which face each other attract each other (an electrostatic attraction acts each other). In this state, the dielectric elastomer 12 is crushed by the electrostatic attraction. In other words, the dielectric elastomer 12 stretches in a direction in the same plane as the surface on which the electrodes 13 and 14 are formed (on the contrary, the thickness of the dielectric elastomer 12 decreases in its film thickness direction between the electrodes 13 and 14).

Further, when the application of a voltage stops, the dielectric elastomer 12 returns its original state. Specifically, the dielectric elastomer 12 in the crushed state expands in the film thickness direction between the electrodes 13 and 14, whereas the dielectric elastomer 12 decreases in size in the direction in which the electrodes 13 and 14 are formed.

The artificial muscle has an elastic force like rubber and has a significantly large expansion and contraction ratio and a high driving force, as compared to an existing actuator. Moreover, it is possible to use the artificial muscle as a driving means in a space that has a high structural degree of freedom and is significantly small and distorted.

The state (initial state) shown in FIG. 2 is a state in which a voltage is not applied between the electrodes 13 and the common electrode 14 that constitute each of the driving member 7, 8 and 9. Each of the respective driving members 7, 8 and 9 presses the internal surface 5b of the movement hole 5a and the external surface 6a of the lens barrel 6, whereby the lens barrel 6 is held without falling down at a position as shown in FIG. 2. As described above, the common electrode 14 is joined and fixed to the external surface 6a of the upper lens barrel 6b and the lower lens barrel 6c, but the outside electrode 13 can be separated from the internal surface by the following operations 5b simply by allowing each outside electrode 13 to abut on the internal surface 5b of the holder 5.

In the following description, the driving member 7 provided on the uppermost side in FIG. 2 is referred to as "second driving member", the driving member 8 provided on the intermediate side is referred to as "third driving member", and the driving member 9 provided on the lowermost side in FIG. 2 is referred to as "first driving member".

Figure 3:
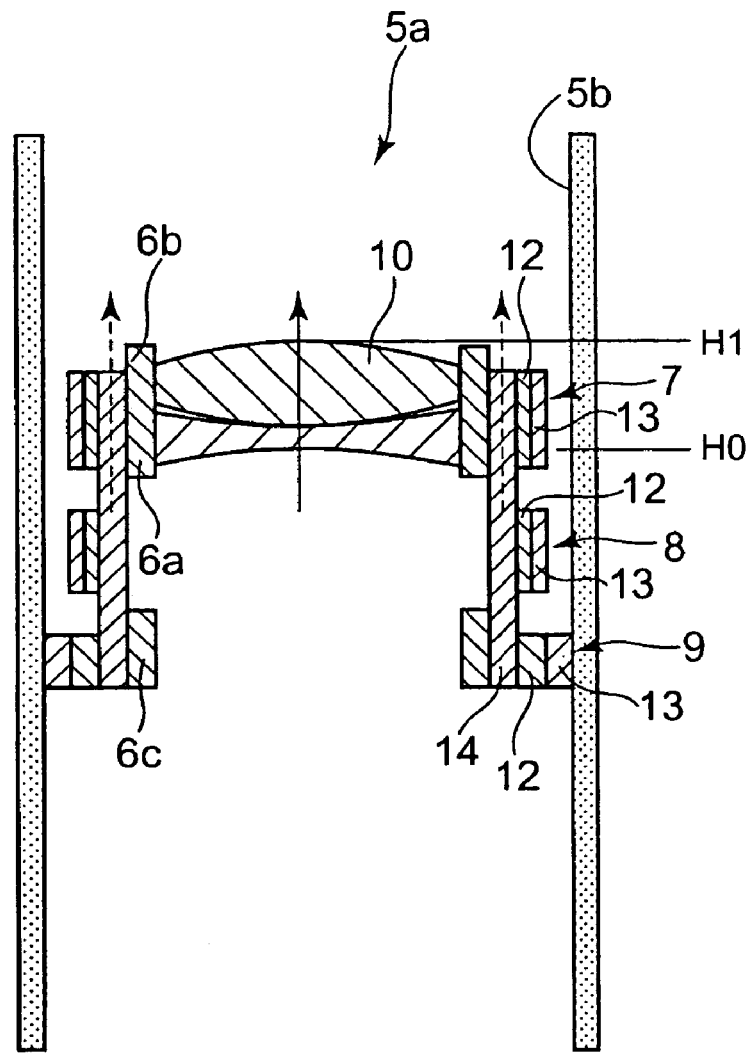
FIG. 3 is a partial sectional view of the actuator for explaining an operation performed subsequent to the operation in FIG. 2.

Next, the state shown in FIG. 2 transits to a state (first operation state) in FIG. 3. In the state in FIG. 3, a voltage is applied between the outside electrodes 13 and the common electrode 14 that constitute the second driving member 7 and the third driving member 8. This causes the dielectric elastomers 12 constituting the second driving member 7 and the third driving member 8 to be crushed in a direction (X1-X2 direction in the drawing) horizontal to the moving direction (Z1-Z2 direction in the drawing) of the lens barrel 6 by an electrostatic attraction. As a result, the outside electrodes 13 constituting the second driving member 7 and the third driving member 8 are separated from the internal surface 5b of the movement hole 5a toward the external surface 6a of the lens barrel 6, and the pressing state between the external surface 6a of the lens barrel 6 and the internal surface 5b of the movement hole 5a by the second driving member 7 and the third driving member 8 is released.

Meanwhile, a voltage is not applied between the outside electrode 13 and the common electrode 14 that constitute the first driving member 9, and the first driving member 9 still presses the external surface 6a of the lens barrel 6 and the internal surface 5b of the movement hole 5a. The pressing state of the first driving member 9 maintains the state of the lens barrel 6 held in the movement hole 5a.

In the state in FIG. 3, the second driving member 7 and the third driving member 8 contract in the X1-X2 direction in the drawing, thereby releasing the pressing state by the second driving member 7 and the third driving member 9. Also, the dielectric elastomers 12 and the electrodes 13 and 14 that constitute the second driving member 7 and the third driving member 8 stretch in the moving direction (Z1-Z2 direction in the drawing). At this time, the first driving member 9 which is located below the second driving member 7 and the third driving member 8 press the external surface 6a of the lens barrel 6 and the internal surface 5b of the movement hole 5a, whereby the lens barrel 6 is in a state where it is constrained below the third driving member 8. Thus, as shown in FIG. 3, when a voltage is supplied to the second driving member 7 and the third driving member 8, the dielectric elastomers 12 and the electrodes 13 and 14 that constitute the second driving member 7 and the third driving member 8 stretch upward in the drawing (see a dotted-line arrow shown in FIG. 3).

As the common electrode 14 stretches upward in the drawing, a portion of the upper lens barrel 6b which is provided at a position that horizontally (X1-X2 direction) faces the second driving member 7 and the third driving member 8 in the lens barrel 6 joined and fixed to the common electrode 14 is moved upward in the drawing (Z1 direction in the drawing).

A height position H0 shown in FIG. 3 indicates an uppermost position of the convex lens 10 accommodated within the upper lens barrel 6b in the initial state shown in FIG. 2. In the first operation in FIG. 3, as the upper lens barrel 6b moves upward in the drawing, an uppermost portion of the convex lens 10 moved upward to a height position H1.

Meanwhile, as discussed referring to FIG. 2, the lens barrel 6 is formed such that it is divided into the upper lens barrel 6b and the lower lens barrel 6c, and the divided region with a predetermined gap T3 is provided between the upper lens barrel 6b and the lower lens barrel 6c.

Preferably, at least a portion of the divided region with this gap T3 is provided at a position (a position in the X1-X2 direction in the direction) that faces the dielectric elastomer 12 constituting the third driving member 8 with the common electrode 14 therebetween. The third driving member 8 functions as a driving means that gives a substantial moving force to the lens barrel 6. Therefore, if the divided region where the lens barrel 6 does not exists is provided at a position that faces the dielectric elastomer 12 constituting the third driving member 8 with the common electrode 14 therebetween so that it does not kept the common electrode 14 joined to the lateral face of the dielectric elastomers 12 of the third driving member 8 from expanding or contracting in the moving direction (Z1-Z2 direction in the drawing) when a voltage is applied between the electrodes 13 and 14 constituting the third driving member, this is preferable because the common electrode 14 located at the position facing the dielectric elastomer 12 constituting the third driving member 8 can expand or contract freely in the moving direction (Z1-Z2 direction in the drawing) without receiving a constraint caused by joining and fixation to the lens barrel 6. In addition, even if the external surface 6a of the lens barrel 6 abuts on the entire inner circumferential surface of the common electrode 14, it is desirable that the common electrode 14 and the lens barrel 6 located at the positions facing the dielectric elastomer 12 constituting the third driving member 8 are not joined and fixed to each other with adhesive.

Figure 4:
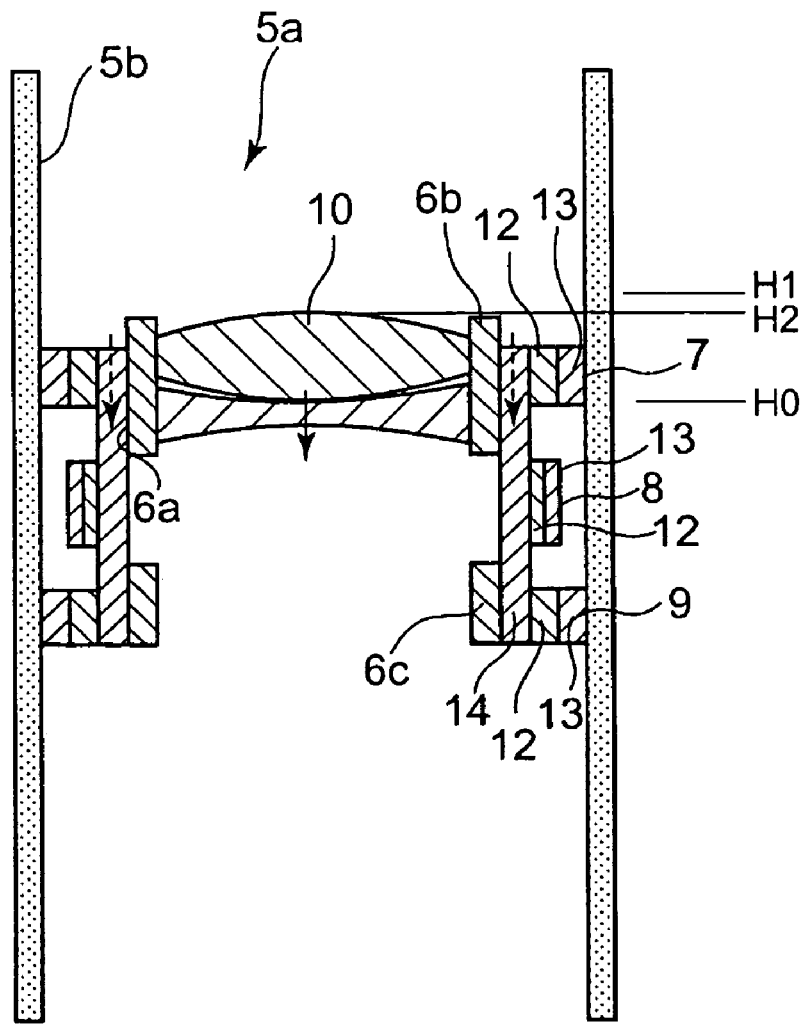
FIG. 4 is a partial sectional view of the actuator for explaining an operation performed subsequent to the operation in FIG. 3.
Figure 4:
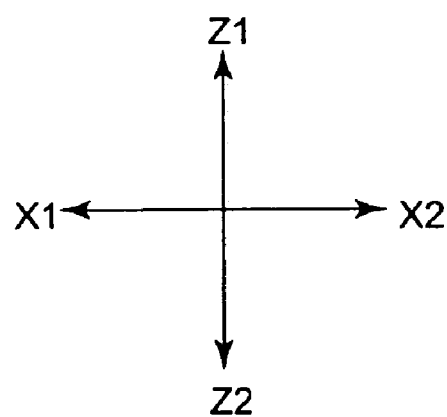

Next, as shown in FIG. 4 (second operation state), the supply of power between the outside electrode 13 and the common electrode 14 that constitute the second driving member 7 is stopped. Then, the dielectric elastomer 12 constituting the second driving member 7 returns to its original state, and the outside electrode 13 of the second driving member 7 abuts on the internal surface 5b of the movement hole 5a, which causes the second driving member 7 to press the external surface 6a of the lens barrel 6 and the internal surface 5b of the movement hole 5a again. At this time, the dielectric elastomer 12 and the electrodes 13 and 14 contract in the moving direction (Z1-Z2 direction in the drawing). However, the first driving member 9 below the second driving member 7 presses the external surface 6a of the lens barrel 6 and the internal surface 5b of the movement hole 5a, thereby constraining the lens barrel 6 below the second driving member 7. Therefore, the dielectric elastomer 12 and the common electrode 14 that constitute the second driving member 7 contract downward in the drawing, and the common electrode 14 at the position joined to the lateral face of the dielectric elastomer 12 of the second driving member 7 also contracts downward in the drawing (see the dotted-line arrow). As a result, the upper lens barrel 6b joined to the position that horizontally (X1-X2 direction in the drawing) faces the second driving member 7 also moves slightly (see a solid-line arrow), and the uppermost height position of the convex lens 10 goes down from H1 to H2.

However, in a state shown in FIG. 4, the dielectric elastomer 12 of the third driving member 8, and the common electrode 14 horizontally (X1-X2 direction in the drawing) joined to the lateral face of the dielectric elastomer 12 are still maintained in the state where it stretches upward in the drawing (Z1 direction in the drawing). Thus, the uppermost height position H2 of the convex lens 10 is maintained at a position higher than the height position H0 in the initial state by the stretched distance.

Figure 5:
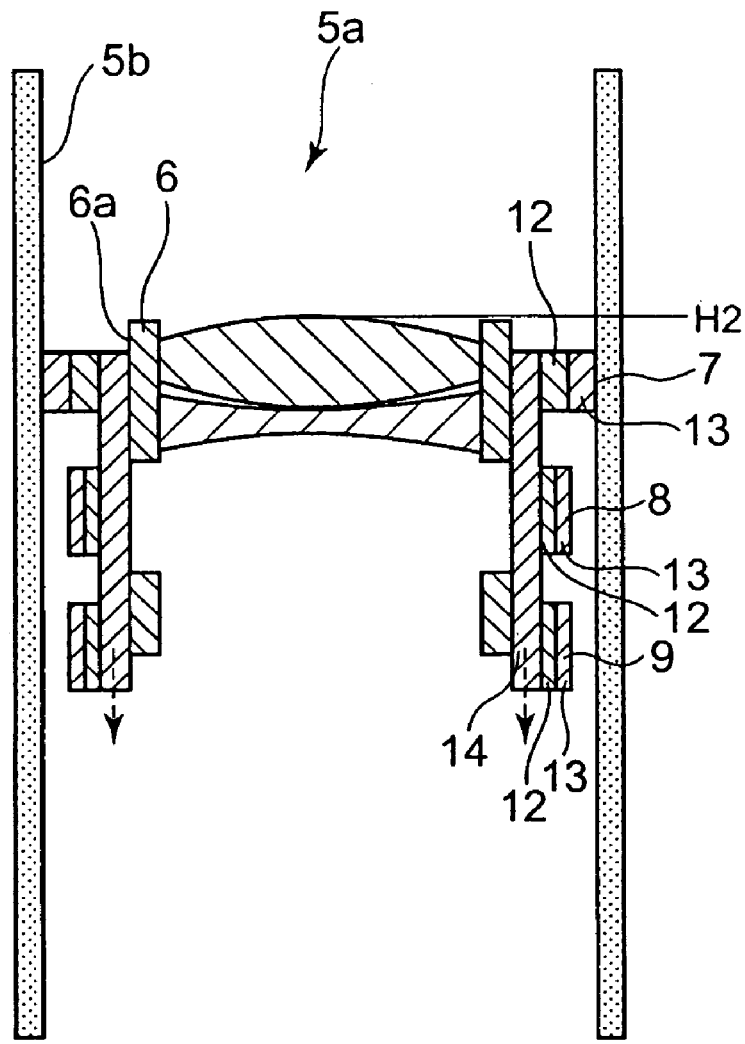
FIG. 5 is a partial sectional view of the actuator for explaining an operation performed subsequent to the operation in FIG. 4.
Figure 5:
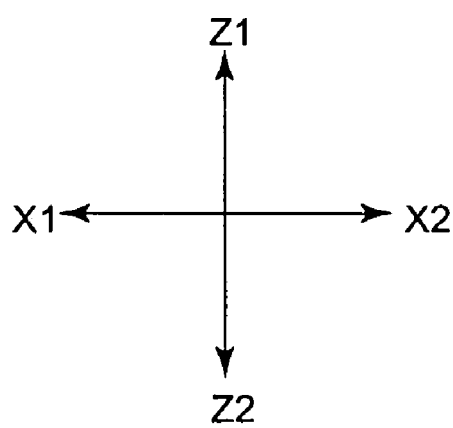

Next, in a state (second operation state) shown in FIG. 5, a voltage is applied between the outside electrode 13 and the common electrode 14 of the first driving member 9. Thereby, the dielectric elastomer 12 of the first driving member 9 is crushed in the horizontal direction with respect to the moving direction (Z1-Z1 direction in the drawing) of the lens barrel 6 by an electrostatic attraction). As a result, the outside electrode 13 of the first driving member 9 is separated from the internal surface 5b of the movement hole 5a, thereby releasing the pressing state between the external surface 6a of the lens barrel 6 and the internal surface 5b of the movement hole 5a by the first driving member 9.

Further, in the state in FIG. 5, the dielectric elastomer 12 of the first driving member 9 stretches in the moving direction (Z1-Z2 direction in the drawing) of the lens barrel 6. However, since the second driving member 7 located above the first driving member 9 presses the external surface 6a of the lens barrel 6 and the internal surface 5b of the movement hole 5a, and the lens barrel 6 is in a state where it is constrained above the first driving member 9, the dielectric elastomer 12 of the first driving member 9 stretches downward in the drawing. As a result, the common electrode 14 located on the inner circumferential surface of the dielectric elastomer 12 of the first driving member 9 and the outside electrode 13 of the first driving member 9 also stretches downward in the drawing (see an arrow direction shown by a dotted line).

Figure 6:
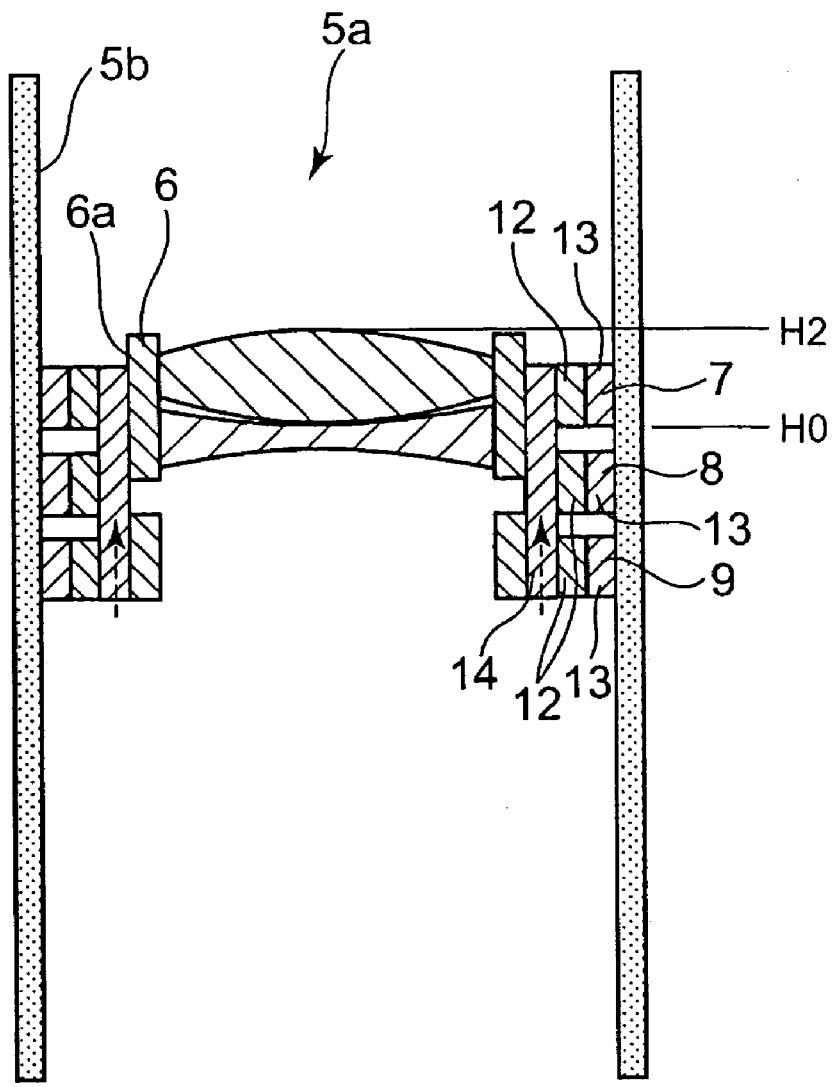
FIG. 6 is a partial sectional view of the actuator for explaining an operation performed subsequent to the operation in FIG. 5.

Next, in a state (third operation state) shown in FIG. 6, the supply of power between the electrodes 13 and 14 constituting the first driving member 9 and between the electrodes 13 and 14 constituting the third driving member 8 stops. Thereby, the dielectric elastomers 12 that constitute the first driving member 9 and the third driving member 8 contract together in the moving direction (Z1-Z2 direction in the drawing) of the lens barrel 6. However, since the second driving member 7 which is located above the first driving member 9 and the third driving member 8 presses the external surface 6a of the lens barrel 6 and the internal surface 5b of the movement hole 5a, and the lens barrel 6 is in a state where it is constrained above the first driving member 9 and the third driving member 8. Therefore, the dielectric elastomers 12 that respectively constitute the first driving member 8 and the third driving member 9 contract upward in the drawing. As a result, the common electrode 14 joined to the inner circumferential surface of the dielectric elastomers 12 of the first driving member 9 and the third driving member 8 also contract upward in the drawing (see an arrow direction shown by a dotted line).

In the operation in FIG. 6, when the supply of power to the first driving member 9 and the third driving member 8 stops, the dielectric elastomers 12 expand in the horizontal direction (X1-X2 direction in the drawing) with respect to the moving direction (Z1-Z2 direction in the drawing) so as to return to their original states, and the outside electrodes 13 that constitute the first driving member 9 and the third driving member 8 abut on the internal surface 5b of the movement hole 5a, thereby setting a pressing state in which the first driving member 9 and the third driving member 8 presses the external surface 6a of the lens barrel 6 and the internal surface 5b of the movement hole 5a. As a result, the driving members 7, 8 and 9 returns to the initial state shown in FIG. 2.

By repeating the series of operations described referring to FIGS. 2 to 6, the lens barrel 6 can be continuously moved upward by a predetermined height (height position H2-height position H0).

Further, in a case where the lens barrel 6 is intended to move downward, it is possible to continuously move the lens barrel 6 downward by sequentially repeating the operations in FIGS. 5, 4, 3 and 6 from the state in FIG. 2.

In the invention, it is possible to rapidly move the lens barrel 6 to a predetermined position by using the artificial muscle having a high expansion and contraction ratio, in which each of the driving members 7, 8 and 9 are constituted of the dielectric elastomer 12 and the expandable and contractable electrodes 13 and electrode 14 on both sides of the dielectric elastomer 12. Further, since the artificial muscle has a high driving force, even if the fine driving members 7, 8 and 9 made up of artificial muscle in the significantly narrow gap T1 between the holder 5 and the lens barrel 6 is used, it is possible to properly move the lens barrel 6 to a predetermined position by driving of the driving members.

Further, since the artificial muscle has elasticity like rubber, even if a pressing force between the external surface 6a of the lens barrel 6 and the internal surface 5b of the movement hole 5a by the driving members 7, 8 and 9 slightly changes due to changes in use environment (temperature change, etc.), the lens barrel 6 can be appropriately supported by means of the driving members 7, 8 and 9.

Since the artificial muscle shown in FIG. 2 is configured to have the dielectric elastomer 12, the outside electrodes 13 and the common electrode 14 that constitute each of the driving members 7, 8 and 9, and the lens barrel 6 is configured to be capable of being moved in the movement hole 5a on the basis on the expansion or contraction of the common electrode 14. Thus, it is possible to configure the lens driving mechanism (actuator) 4 having the holder 5, the lens barrel 6 and the driving members 7, 8 and 9 with a simple structure, particularly without contriving the structure of the lens barrel 6, so long as there is space for attaching the common electrode 14 to the external surface 6a of the lens barrel 6.

In addition, as shown in FIG. 7, it is possible to adopt a construction in which one dielectric elastomer 12 is shared by the driving members 7, 8 and 9, and a portion of dielectric elastomer 12 corresponding to each of the driving members 7, 8 and 9 can expand or contract in a predetermined direction. In this case, the driving members 7, 8 and 9 can be simply configured.

FIG. 8 shows a planar structure of the holder 5, the lens barrel 6, and the driving members 7, 8 and 9 according to the invention (only the driving member 7 provided on the uppermost side is shown in FIG. 8). The driving members 7, 8 and 9 are provided without clearance in the circumferential direction within the gap T1 provided between the internal surface 5b of the holder 5 and the external surface 6a of the lens barrel 6. However, for example, as shown in FIG. 9, it may configured such that each of the driving members 7, 8 and 9 are divided into four parts, and the divided driving parts 7a, 7b, 7c and 7d are arranged with a predetermined gap T9 therebetween along the circumferential direction of the lens barrel 6 and the holder 5 within the gap T1 provided between the internal surface 5b of the holder 5 and the external surface 6a of the lens barrel 6.

As shown in FIG. 9, if each of the driving members 7, 8 and 9 is formed so as to be divided into a plurality of parts, the divided driving parts 7a, 7b, 7c and 7d can be independently driven, and adjustment of the lenses 10 and 11 in the horizontal direction (X1-X2 direction with respect to the moving direction (Z1-Z2 direction in the drawing), such as optical axis alignment, can be appropriately performed.

In a lens driving mechanism (actuator) 4 shown in FIG. 10, similar to FIG. 2, driving members 7, 8 and 9 are provided with a predetermined gap therebetween in the moving direction (Z1-Z2 direction in the drawing). Each of the driving members 7, 8 and 9 is composed of a dielectric elastomer 12 and expandable and contractable electrodes 20 and 21. Similar to FIG. 8, the dielectric elastomer 12 is formed in a ring shape as seen from right above, and the inside electrode 20 formed in a ring shape as seen from right above is provided on the inner circumferential surface of the dielectric elastomer 12. The outer circumferential surface of the dielectric elastomer 12 is provided with a cylindrical common electrode 21 integrally formed over the entire outer circumference of the dielectric elastomer 12 of each of the driving members 7, 8 and 9.

In the embodiment shown in FIG. 10, a supporting part 22 that is formed in a ring shape as seen from right above is formed so as to protrude from an internal surface 5b of a holder 5 toward an external surface 6a of a lens barrel 6. The outer circumferential surface of the common electrode 21 is fixed to and supported by the supporting part 22. In the embodiment shown in FIG. 10, unlike the embodiment in FIG. 2, the respective driving members 7, 8 and 9 are fixed to and supported by the holder 5. The width T8 of the supporting part 22 in the Z1-Z2 direction in the drawing is smaller than the width T4 of the common electrode 21 in the Z1-Z2 direction in the drawing. The outer circumferential surface of the common electrode 21 is fixed to and supported by the ring-shaped supporting part 22 at almost a middle position in the Z1-Z2 direction.

The inside electrode 20 of each of the driving members 7, 8 and 9 is not joined to the external surface 6a of the lens barrel 6, but can be separated from the external surface 6a of the lens barrel 6 by contraction of the dielectric elastomer 12 in the horizontal direction (X1-X2 direction in the drawing) with respect to the moving direction. The state in FIG. 10 is a state in which the driving members 7, 8 and 9 is pressed toward the external surface 6a of the lens barrel 6 to press the between the external surface 6a of the lens barrel 6 and the internal surface 5b of the holder 6. By repeating the same operations as those described referring to FIGS. 3 to 6 from the state in FIG. 10, the lens barrel 6 can be moved upward or downward.

In an actuator shown in FIG. 11, unlike the actuator in FIG. 10, four driving members 25 to 28 are provided with a predetermined gap therebetween in the moving direction (Z1-Z2 direction in the drawing).

In FIG. 11, the outer circumferential surface of a common electrode 21 of each of the driving members 25 to 28 is also fixed to and supported by a ring-shaped supporting part 22 at almost a middle position in the moving direction.

In the embodiment in FIG. 11, dielectric elastomer 12 and inside electrode 20 that constitute the two driving members 25 and 26 are provided higher in the moving direction (Z1-Z2 direction) than the position of the common electrode 21 supported by the supporting part 22, and dielectric elastomers 12 and inside electrodes 20 that constitute the two driving members 27 and 28 are provided lower in the moving direction (Z1-Z2 direction) than the supported position. Thus, with the supporting part as a boundary, the common electrode 21 expands or contracts easily in the moving direction by the expansion or contraction of the driving members 26 and 27 (third driving member) in the moving direction (Z1-Z2 direction in the drawing), thereby rapidly moving the lens barrel 6 vertically with a high driving force.

In the embodiments in FIGS. 2 to 11, each of the driving members is composed of the separated provided dielectric elastomer, the expandable and contractable electrode separated provided on the lateral face of the dielectric elastomer which faces the external surface 6a of the lens barrel 6 or the internal surface 5b of the holder 5, and the common electrode integrally formed on the lateral face of the dielectric elastomer opposite to its lateral face provided with the expandable and contractable electrode, over the entire lateral face of the dielectric elastomer. However, in an embodiment in FIG. 12, each of the driving members is composed of a separated provided dielectric elastomer, and expandable and contractable electrodes separated provided on both lateral faces of the dielectric elastomer, without using the common electrode.

Figure 12:
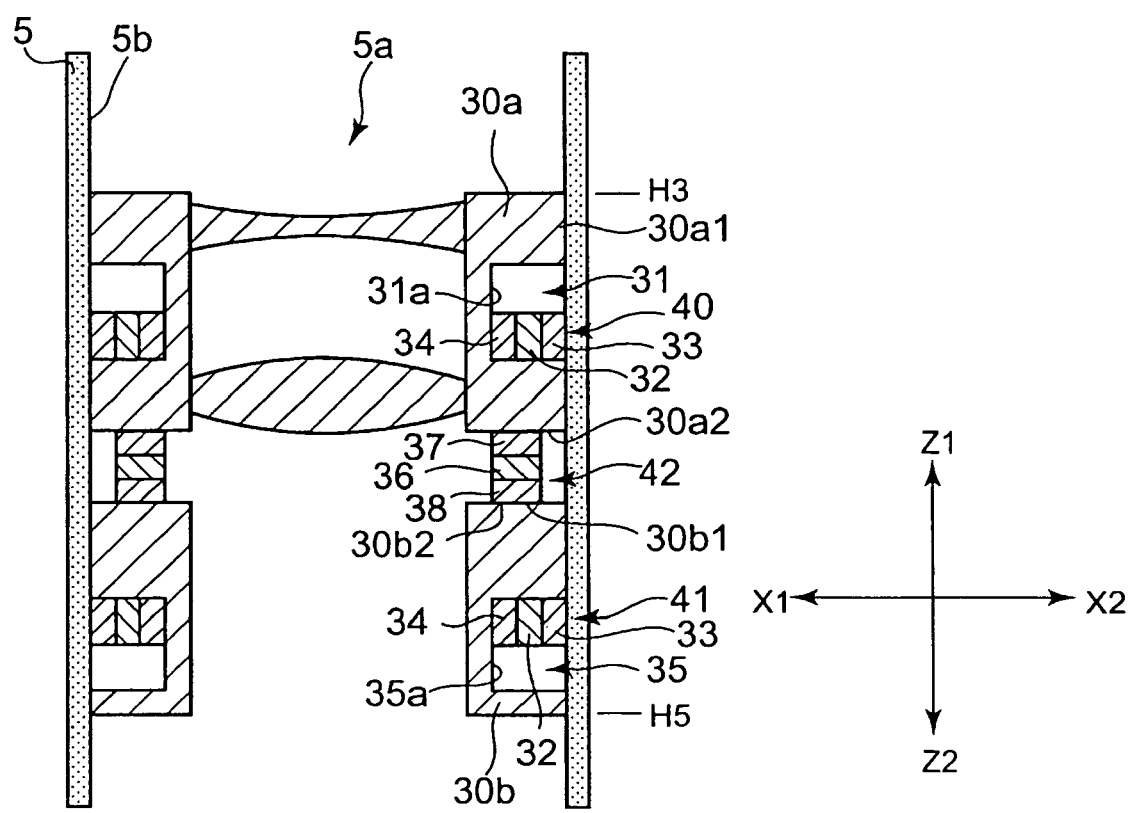
FIG. 12 is a partial sectional view of an actuator according to a third embodiment of the invention, and an explanatory view for explaining a series of operations of the actuator.

As shown in FIG. 12, a lens barrel 30 is provided so as to be divided into an upper lens barrel 30a and a lower lens barrel 30b in the moving direction (in the Z1-Z2-direction). The upper lens barrel 30a and the lower lens barrel 30b form a cylindrical shape together.

As shown in FIG. 12, an outer circumferential surface 30a1 of the upper lens barrel 30a is provided with a concave portion 31 which is concaved in a ring shape, as seen from right above, toward the center of the upper lens barrel 30a. The inside of the concave portion 31 is provided with a driving member 40 composed of a dielectric elastomer 32 formed in a ring shape as seen from right above, and expandable and contractable electrodes 33 and 34 formed in a ring shape as seen from right above and provided on both lateral faces of the dielectric elastomer 32 which face the internal surface 5b of the holder 5 and a lateral face 31 in the concave portion 31.

As shown in FIG. 12, an outer circumferential surface 30b1 of the lower lens barrel 30b is provided with a concave portion 35 which is concaved in a ring shape, as seen from right above, toward the center of the lower lens barrel 30b. The inside of the concave portion 35 is provided with a driving member 41 composed of a dielectric elastomer 32 formed in a ring shape as seen from right above, and expandable and contractable electrodes 33 and 34 formed in ring shape as seen from right above and provided on both lateral faces which face the internal surface 5b of the holder 5 and a lateral face 35a in the concave portion 35.

As shown in FIG. 12, provided between a lower face 30a2 of the upper lens barrel 30a and an upper face 30b2 of the lower lens barrel 30b is a driving member 42 composed of a dielectric elastomer 36 formed in a ring shape as seen from right above, and expandable and contractable electrodes 37 and 38 formed in a ring shape as seen from right above and provided on the upper and lower faces of the dielectric elastomer 36.

The state in FIG. 12 is an initial state in which a voltage is not applied between the electrodes constituting each of the driving members 40, 41 and 42. In this initial state, the lens barrel 30 is maintained in a state held at a predetermined position in the movement hole 5a of the holder 5 without falling down while the driving member 40 and the driving member 42 respectively provided in the corresponding concave portions 31 and 35 of the upper lens barrel 30a and the lower lens barrel 30b presses the lens barrel 30 and the internal surface 5b of the holder 5.

In the state in FIG. 12, the height position of the upper face of the upper lens barrel 30a is H3, and the height position of the lower face of the lower lens barrel 30b H5. In addition, the following description will be made referring to the driving member 40 as "first driving member", the driving member 41 as "second driving member", and the driving member 42 as "third driving member".

Figure 13:
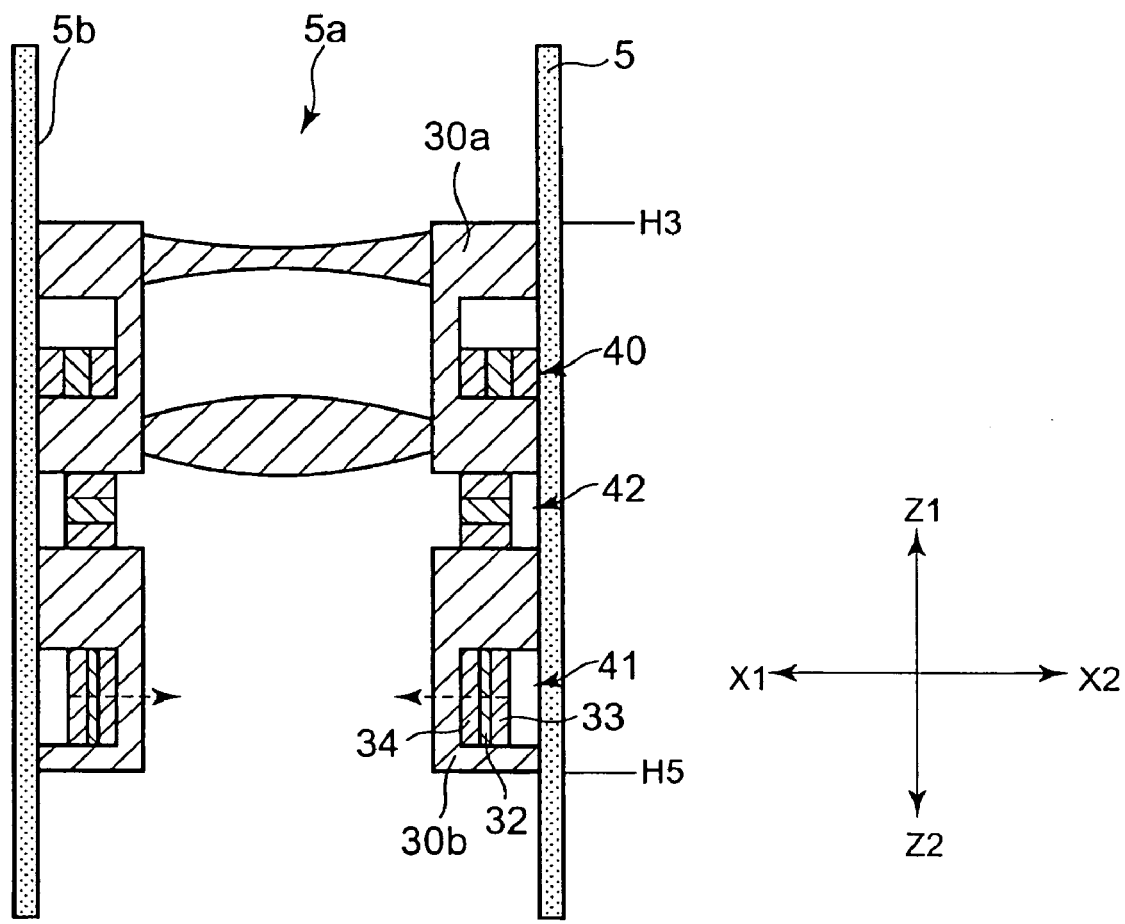
FIG. 13 is a partial sectional view of the actuator for explaining an operation performed subsequent to the operation in FIG. 12.

In a state (first operation state) shown in FIG. 13, since the first driving member 40 is not supplied with power, the first driving member 40 maintains the state in which it presses the upper lens barrel 30a and the internal surface 5b of the holder 5.

In FIG. 13, as a voltage is applied between the electrodes 33 and 34 of the second driving member 41, the dielectric elastomer 32 is crushed in the lateral direction (X1-X2 direction in the drawing) by an electrostatic attraction), thereby separating the electrode 33 of the second driving member 41 from the internal surface 5b of the holder 5 (indicated by a dotted-line arrow). This releases the pressing state between the lens barrel 30 and the internal surface 5b of the holder 5 by the second driving member 41.

Figure 14:
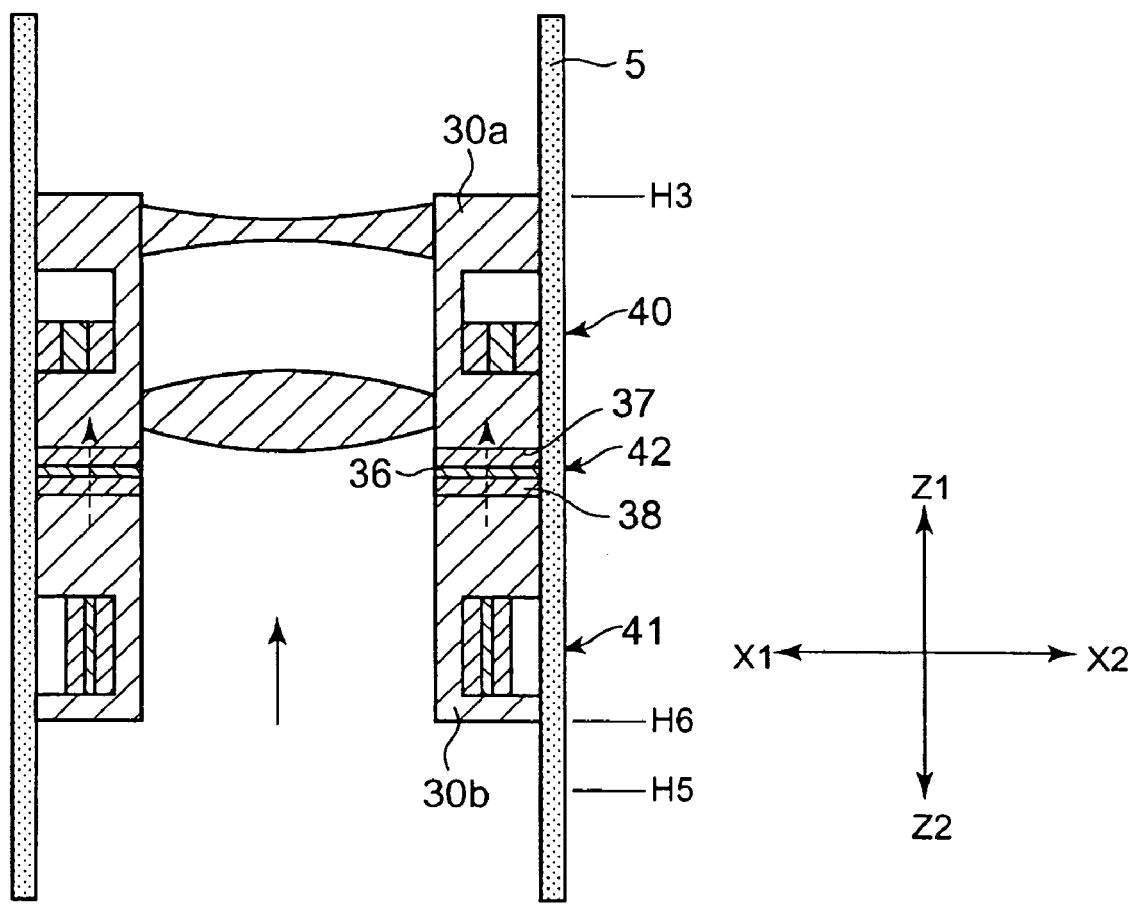
FIG. 14 is a partial sectional view of the actuator for explaining an operation performed subsequent to the operation in FIG. 13.

Next, in a state (first operation state) shown in FIG. 14, as a voltage is applied between the electrodes 37 and 38 of the third driving member 42, the dielectric elastomer 36 is crushed in the moving direction (Z1-Z2 direction in the drawing) by an electrostatic attraction and thus contracts in the moving direction. At this time, since the upper lens barrel 30a is constrained by the pressing state between itself and the holder 5 by the first driving member 40, and the lower lens barrel 30b is in a non-constrained state, the third driving member 42 contracts upward in the drawing (indicated by a dotted-line arrow). This moves the lower face of the lower lens barrel 30b up to the height position H6 fro the height position Holder 5 (indicted by a solid-line arrow).

Figure 15:
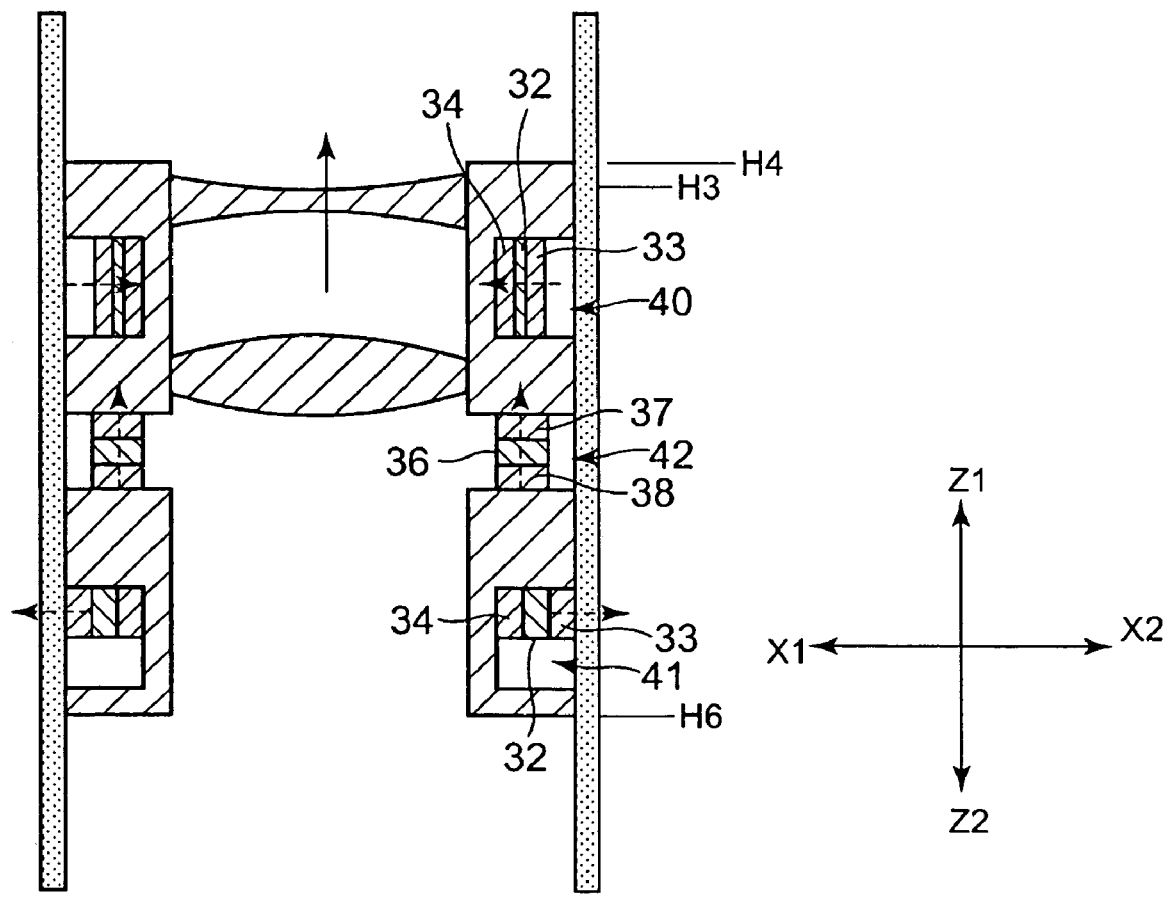
FIG. 15 is a partial sectional view of the actuator for explaining an operation performed subsequent to the operation in FIG. 14.

Next, in a state (second operation state in FIG. 15, as the supply of power to the electrodes 33 and 34 of the second driving member 41 stops, the second driving member 41 returns to its original state, and the second driving member 41 presses the internal surface 5a of the holder 5 and the lens barrel 30. Accordingly, the lower lens barrel 30b is constrained at the position in FIG. 15, and the height position of the lower lens barrel 30b is maintained at the position H6.

Next, as a voltage is applied between the electrodes 33 and 34 of the first driving member 40, the dielectric elastomer 32 is crushed in the lateral direction (X1-X2 direction in the drawing) by an electrostatic attraction, thereby separating the outside electrode 33 from the internal surface 5b of the holder 5. This releases the pressing state between the upper lens barrel 30a and the internal surface 5b of the holder 5 by the first driving member 40.

Next, as the supply of power to the electrodes 37 and 38 of the third driving member 42 stops, the third driving member 42 returns to its original state. The third driving member 42 expands upward and downward. At this time, the lower lens barrel 30b located below the third driving member 42 is in a constrained state at the position in FIG. 15 by the pressing of the second driving member 41 against the holder 5. On the other hand, the upper lens barrel 30a is in a non-constrained state because the pressing state of the first driving member 40 to the holder 5 is released. Therefore, the third driving member 42 expands upward in the drawing (indicated by a dotted-line arrow), which moves the upper lens barrel 30a upward in the drawing (indicated by a solid-line arrow). The upper face of the upper lens barrel 30a is moved upward to the height position H4 from the height position H3.

Then, as the supply of power between electrodes 33 and 34 of the first driving member 40 stops and thus the first driving member 40 returns to its original state, the first driving member 40 presses the internal surface 5b of the holder 5 and the lens barrel 30. This moves each of the driving members 40, 41 and 42 to its initial state.

By repeating the series of operations described referring to FIGS. 12 to 15, the upper lens barrel 30a can be continuously moved upward by a height of (height position H4-height position H3).

Also, by repeating operations reverse to the series of operations described referring to FIGS. 12 to 15, the lower lens barrel 30b can be continuously moved downward.

It can be expected that the artificial muscle having the dielectric elastomer and the expandable and contractable electrodes provided on both sides thereof have the following advantages because it has a high driving force, a high expansion or contraction ratio and elasticity like rubber.

In a lens barrel 6 which moves within a movement hole 5a of a holder 5 shown in FIG. 16, similar to the embodiment described referring to FIG. 2, an external surface 6a of the lens barrel 6 is provided with driving members 7, 8 and 9 each of which is composed of a common electrode 14, a dielectric elastomer 12 and an outside electrode 13.

In the embodiment shown in FIG. 16, step difference A is given to the internal surface 5b of the movement hole 5a of the holder 5.

Further, in an embodiment shown in FIG. 17, an internal surface 5b of a movement hole 5a of a holder 5 has a serpentine shape that has repeated undulations in the moving direction (Z1-Z2 direction).

In the embodiment in FIG. 2, since the internal surface 5b of the movement hole 5a of the holder 51 is cylindrical, the ring-shaped outside electrode 13 easily abuts fittingly on the internal surface 5b. However, as shown in FIG. 16 or 17, even if the internal surface 5b becomes stepped or distorted, the driving members 7, 8 and 9 can be driven on the internal surface 5b while holding the lens barrel 6 securely, in conformity with the shape of the internal surface 5b by allowing the driving members 7, 8 and 9 to repeat the series of operations referring to FIG. 6. This is because the above-described artificial muscle has a high driving force and elasticity like rubber and therefore the driving members 7, 8 and 9 can be deformed freely in conformity with the change in shape of the internal surface 5b. As a result, the lens barrel 6 can be appropriately and easily moved in the movement hole 5a irrespective of the internal surface 5b of the holder 5.

Meanwhile, in the present invention, the position of the lens barrel 6 within the movement hole 5a of the holder 5 can be detected based on changes in capacitance of the driving members 7, 8 and 9 composed of the artificial muscle without using position sensors separately.

In an embodiment shown in FIG. 18, a plurality of projections 50 are formed on the internal surface 5b of the movement hole 5a of the holder 5 with a predetermined gap T5 therebetween in the moving direction (Z1-Z2 direction in the drawing) so as to protrude toward the external surface 6a of the lens barrel 6. For example, each of the projections 50 is formed so as to protrude in a ring shape as seen from right above.

For example, the gap T5 has dimension such that just one of the driving members 7, 8 and 9 can enter the gap. As shown in FIG. 18, while the driving member 8 enters the gap T5 between the projections 50, the driving members 7 and 9 above and below the driving member 8 is in a state in which they ride on the projections 50.

As shown in FIG. 18, "position level" is affixed onto the projections 50 and within the gap T5 between the projections 50 sequentially from the lower side of the internal surface 5b of the holder 5 toward the upper side thereof.

In the embodiment shown in FIG. 18, for example, when the driving member 9 is allowed to function as a position sensor, the driving member 9 is now located at "Position Level 5" in the state in FIG. 18.

The dielectric elastomer 12 constituting the driving member 9 is different in the amount of deformation when the driving member 9 abuts on any one of the projections 50 and when it abuts on the internal surface 5b of the holder 5 within the gap T5. The dielectric elastomer 12 is further crushed when the driving member 9 abuts on any one of the projections 50 Therefore, the capacitance when the driving member abuts on any one of the projections becomes larger than that when the driving member abuts on the internal surface 5b in the gap T5.

Accordingly, if a voltage change is detected based on the changes in capacitance, it can be recognized whether the driving member 9 abuts on the projections 50 or it abuts on the internal surface 5b in the gap T5.

If the driving member 9 is assumed to be located at a position of "Position Level 0", and the driving members 7, 8 and 9 is driven upward y the series of operations described referring to FIG. 6, the abutment position of the driving member 9 changes in the order of "Position Level 0", "Position Level 1", "Position Level 2", At this time, if a voltage change is detected at each of the position levels, the voltage change is caused in a cycle of a low voltage ("Position Level 0", a high voltage ("Position Level 1"), the low voltage ("Position Level 0"), . Thus, by plotting the voltage change, it can be recognized that the driving member 9 is now located at the position of "Position Level 3" (a third position having the high voltage).

Alternatively, as shown in FIGS. 19 and 20, an internal surface 5b of a holder 5 is provided with a concave portion 60 of which the width T6 decreases gradually in the moving direction (Z1-Z2 direction in the drawing). By the formation of the concave portion 60, the cross-sectional area B of the holder 5 when cut in the horizontal direction with respect to the moving direction (Z1-Z2 direction in the drawing) increases continuously in the moving direction (Z1-Z2 direction in the drawing).

Further, as shown in FIG. 21, as shown in FIG. 21, an internal surface 5b of a holder 5 is provided with a concave portion 70 of which the width T7 decreases intermittently in the moving direction (Z1-Z2 direction in the drawing). By the formation of the concave portion 70, the cross-sectional area B of the holder 5 when cut in the horizontal direction with respect to the moving direction (Z1-Z2 direction in the drawing) increases intermittently in the moving direction (Z1-Z2 direction in the drawing).

As shown in FIG. 19 to FIG. 21, since a voltage value based on the capacitance obtained from the driving member 9 changes according to abutment places of the driving member 9 on the internal surface 5b even in the structure in which the cross-sectional area of the holder 5 when the holder is cut in the horizontal direction with respect to the moving direction (Z1-Z2 direction in the drawing) changes continuously or intermittently in the moving direction, the position of the driving member 9 can be detected from the voltage change. As a result, the movement position of the lens barrel 6 can be detected.

In addition, in the embodiment in FIGS. 10 and 11, if the deformed places shown in FIGS. 19 to 21 are provided on the external surface 6a of the lens barrel 6, similar to the above, the driving member can be used as the position sensor.

Further, in FIGS. 19 to 21, the concave portion 60 or 70 is formed. However, in FIGS. 19 to 21, the entire inner circumferential surface of the holder 5 may be adapted to be tapered in the Z1 direction in the drawings.

As shown in FIG. 22, the holder 5 or a lens 80 accommodated within the lens barrel 6 can also be moved vertically using the driving member (artificial muscle) having the dielectric elastomer and the expandable and contractable electrodes.

As shown in FIG. 22, an image pickup device 19 is incorporated into a main body 1a of a digital camera 1, the holder 5 is attached to the front of the main body 1a, and a lens barrel 6 accommodating a plurality of lenses 80 and 81 are provided within the movement hole 5a of the holder 5.

As shown in FIG. 22, driving means C and D provided between the holder 5 and the lens barrel 6 have the same structure as the driving means shown in FIG. 10.

In FIG. 22, driving means E and F made of the artificial muscle are also used between the holder 5 and the main body 1a. The driving means E and F have the same structure as the driving means shown in FIG. 10.

Moreover, in FIG. 22, driving means G and H made of the artificial muscle are also used between the lens barrel 6 and the lens 80. The driving means G and h have the same structure as the driving means shown in FIG. 2 (in addition, the driving means G and H is simplified in the drawing).

As described above, the driving means according to the invention can be used in various portions of the digital camera 1, a zooming function, a focusing function, and other various functions can be easily achieved by a driving means made of the artificial muscle.

FIG. 23 is a process chart showing a method of manufacturing the lens driving mechanism (actuator) according to the invention.

In the process shown in FIG. 23, for example, a cylindrical jig 90 having a movement hole 90a similar to the holder 5 is prepared, and a single or a plurality of barrels 6 is accommodated within the jig 90.

In the lens barrel 6, similar to FIG. 2, driving members 7, 8 and 9 composed of at least three dielectric elastomers with a predetermined gap therebetween along in the moving direction (Z1-Z2 direction) and expandable and contractable electrodes are provided on an external surface 6a of the lens barrel 6.

As shown in FIG. 23, after the jig 90 is attached to, for example, the lower face of the holder 5 and movement holes 5a and 90a continuous from the jig 90 toward the holder 5 are formed, the series of operations referring to FIGS. 2 to 6 are repeatedly performed on the driving members 7, 8 and 9 attached to the lens barrel 6 accommodated within the jig 90 so that the lens barrel 6 is allowed to enter the movement hole 5a of the holder 5 from the inside of the movement hole 90a of the jig 90, thereby moving the lens barrel 6 to a predetermined position in the holder 5. An internal surface 5b of the holder 5 is provided with projections 50 similar to those described referring to FIG. 18. The lens barrel 6 is moved to the predetermined position while detecting the movement position of the lens barrel 6 by a voltage change based on the changes in capacitance that are different when the driving members 7, 8 and 9 abut on the projections 50 and when they abut on the internal surface 5b in a gap between the projections 50.

As described above, since the lens barrel 6 to which the driving members 7, 8 and 9 attached can be simply moved to a predetermined position within the holder 5 from the outside of the holder 5, the process of attaching the lens barrel 6 to the inside of the holder 5 becomes very simple.

In addition, the above embodiments have been described in conjunction with the optical apparatus having the lens barrel 6, the holder 5, and the driving member made of the artificial muscle provided between the lens barrel 6 and the holder 5. However, the actuator of the invention is not limited to application to the optical apparatus so long as it has a driving means composed an external member having a movement hole, a movable body which moves within the movement hole, and an artificial muscle for driving the movable body.

Further, the number of driving means is not particularly limited so long as at least three or more driving means made of an artificial muscle for driving the movable body are arranged with a predetermined gap therebetween.

Further, the above embodiments have been described about the case in which each of the driving members is composed of a dielectric elastomer and expandable and contractable electrodes formed on both sides of the dielectric elastomer. However, if the driving members are made of a high-polymer material responsive to an electric field, the driving members can press the movement hole and the movable body particularly without being supplied with a voltage. Thus, by placing the driving member in an electric field, the high-polymer material expands or contracts in the direction of the electric field (expands in the direction to the direction of the electric field). Thus, the movable body can be moved within the movement hole by using such a principle.

As described above, by using the artificial muscle in which each of the driving members has the dielectric elastomer and the expandable and contractable electrodes, the movable body which moves within the movement hole of the external member can be rapidly moved with a high driving force.

What is claimed is:

1. An actuator comprising:
   an external member having a movement hole;
   a movable body which moves within the movement hole; and
   a driving means for mechanically driving the movable body,
   wherein the driving means has a first driving member and a second driving member capable of pressing an external surface of the movable body and an internal surface of the movement hole, and a third driving member located between the first driving member and the second driving member to apply a substantial driving force to the movable body, the first, second and third driving members being arranged with a predetermined gap therebetween in a moving direction of the movable body, and
   wherein each of the first driving member, the second driving member, and the third driving member is made of a high-polymer material having responsiveness to an electric field, and the first driving member, the second driving member, and the third driving member are provided between the external surface of the movable body and the internal surface of the movement hole.

2. The actuator according to claim 1,
   wherein both the first driving member and the second driving member has
   an initial state in which the first and second driving members press the external surface of the movable body and the internal surface of the movement hole;
   a first operation in which, while the first driving member maintains its pressing state from the initial state, the second driving member contracts in a direction away from the external surface of the movable body or the internal surface of the movement hole so that the pressing state of the second driving member is released, and the third driving member expands or contracts in the moving direction of the movable body;
   a second operation in which the second driving member expands toward the external surface of the movable body or the internal surface of the movement hole so that the second driving member returns to the state of pressing the external surface of the movable body and the internal surface of the movement hole, and the first driving member is separated away from the external surface of the movable body or the internal surface of the movement hole so that the pressing state of the first driving member is released, and
   a third operation in which the third driving member returns to its initial state, and the first driving member expands toward the external surface of the movable body or the internal surface of the movement hole so that the first driving member returns to the state of pressing the external surface of the movable body and the internal surface of the movement hole, and
   wherein the movable body moves within the movement hole by repeating a series of operations including the first operation, the second operation and the third operation from the initial state.

3. The actuator according to claim 1,
   wherein each of the first driving member, the second driving member, and the third driving member has a dielectric elastomer, and expandable and contractable electrodes provided on both sides of the dielectric elastomer.

4. The actuator according to claim 3,
   wherein each of the first driving member, the second driving member, and the third driving member has the dielectric elastomer, and the electrodes provided on both lateral faces of the dielectric elastomer that faces the external surface of the movable body and the internal surface of the movement hole,
   one of the electrodes which faces the external surface of the movable body or the internal surface of the movement hole is provided over the entire lateral face of the dielectric elastomer constituting each of the driving members, as an electrode common to the first driving member, the second driving member, and the third driving member, in the initial state, at least the electrodes constituting the first driving member and the second driving member abut on the external surface of the movable body and the internal surface of the movement hole to press the external surface of the movable body and the internal surface of the movement hole; and in the first operation, the third driving member performs an operation of expanding in the moving direction of the movable body.

5. The actuator according to claim 4, wherein the electrode of the first driving member, the second driving member, and the third driving member which faces the external surface of the movable body is the common electrode and the common electrode is fixed to and supported by the external surface of the movable body.

6. The actuator according to claim 5, wherein the movable body is divided into at least two or more with a predetermined gap therebetween in its moving direction, and the predetermined gap faces a portion of the dielectric elastomer constituting the third driving member with the common electrode therebetween.

7. The actuator according to claim 4, wherein the electrode of the first driving member, the second driving member, and the third driving member which faces the internal surface of the movement hole is the common electrode and the common electrode is fixed to and supported by a supporting part protruding from the internal surface of the movement hole toward the external surface of the movable body.

8. The actuator according to claim 4, wherein the first to third driving members shares one dielectric elastomer, and a portion of the one dielectric elastomer corresponding to each of the driving members contracts partially in a predetermined direction.

9. The actuator according to claim 3, wherein the internal surface of the movement hole or the external surface of the movable body is provided, in the moving direction, with spots having their shapes deformed at pressing positions of the driving members, and the position of the movable body within the movement hole is detected based on a change in the amount of deformation of the dielectric elastomer when the dielectric elastomer and the electrodes of each of the driving members presses the internal surface of the movement hole and the external surface of the movable body.

10. The actuator according to claim 9, wherein a plurality of projections are provided at predetermined intervals in the moving direction of the movable body.

11. The actuator according to claim 9, wherein the cross-sectional area of the movable body or the external member when being cut in the horizontal direction with respect to the moving direction changes continuously or intermittently.

12. An optical apparatus using the actuator according to claim 1, wherein the external member is a cylindrical holder, the movable body is a lens barrel, and a lens is accommodated within the lens barrel.

13. A method of manufacturing the actuator according to claim 5, the method comprising the steps of:

accommodating the movable body having the driving members within a jig having a movement hole;

attaching the jig to the external member so as to form a movement hole continuous from the external member toward the external member; and moving the movable body to a predetermined position in the movement hole of the external member from the movement hole of the jig by repeatedly performing the series of operations on the driving members accommodated within the jig.

14. An actuator comprising:

an external member having a movement hole;

a movable body movably provided within the movement hole of the external member; and a driving means for mechanically driving the movable body, including a first driving member, a second driving member, and a third driving member provided therebetween, wherein the first, second, and third driving members are provided between an external surface of the movable body and an internal surface of the movement hole and cooperatively drive the movable body, the first and second driving members being capable of pressing the external surface of the movable body and the internal surface of the movement hole, respectively, the third driving member being capable of applying a substantial driving force to the movable body, and wherein each of the first driving member, the second driving member, and the third driving member includes a high-polymer material having responsiveness to an electric field.

15. The actuator of claim 14, wherein each of the first, second and third driving members suffounds the moving body, a predetermined gap being provided between the first and third driving members and between the third and second moving members in a moving direction of the moving body.

* * * * *